Figure 1:
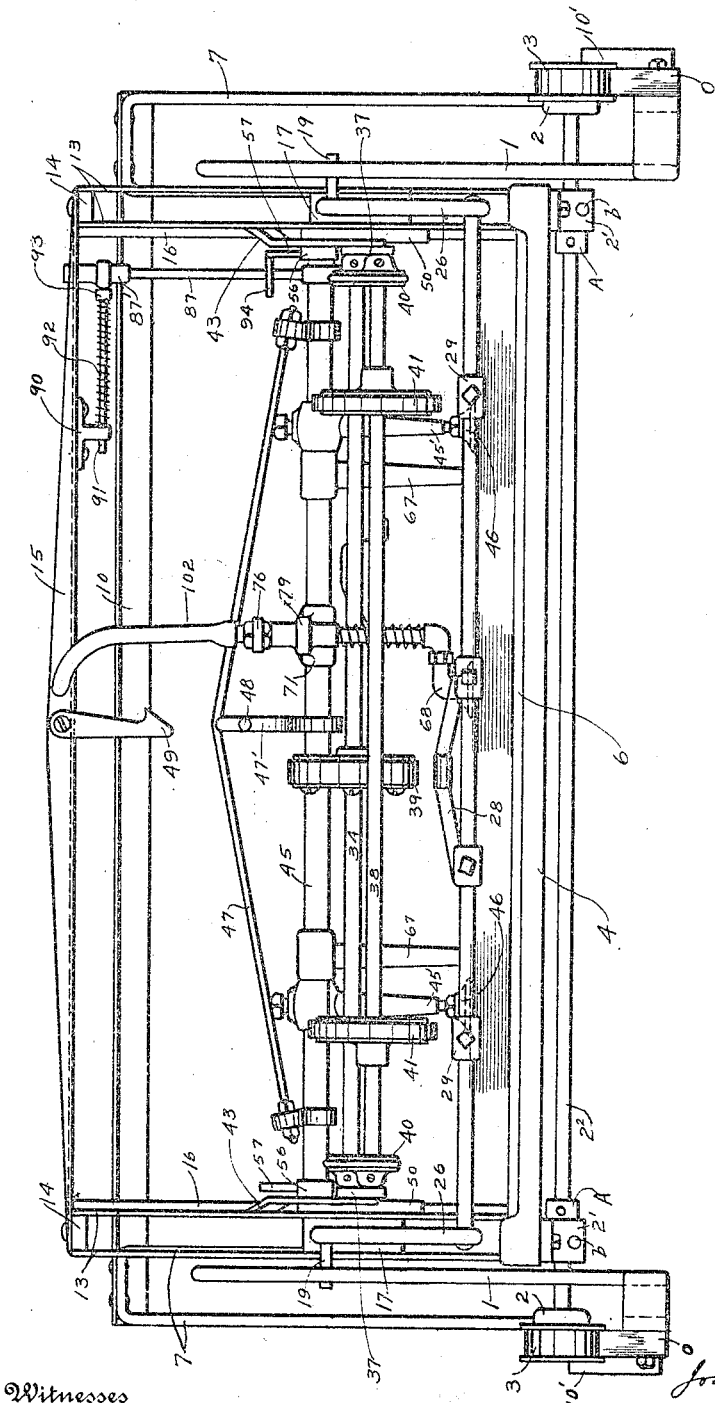

J. F. JIROUSEK & N. T. PLUMMER.
INTERLEAVING DEVICE.
APPLICATION FILED APR. 16, 1912.

1,069,787.

Patented Aug. 12, 1913.

J. F. JIROUSEK & N. T. PLUMMER.
INTERLEAVING DEVICE.
APPLICATION FILED APR. 16, 1912.

1,069,787.

Patented Aug. 12, 1913.
15 SHEETS—SHEET 6.

J. F. JIROUSEK & N. T. PLUMMER.
INTERLEAVING DEVICE.
APPLICATION FILED APR. 16, 1912.
1,069,787.
Patented Aug. 12, 1913.
15 SHEETS—SHEET 7.
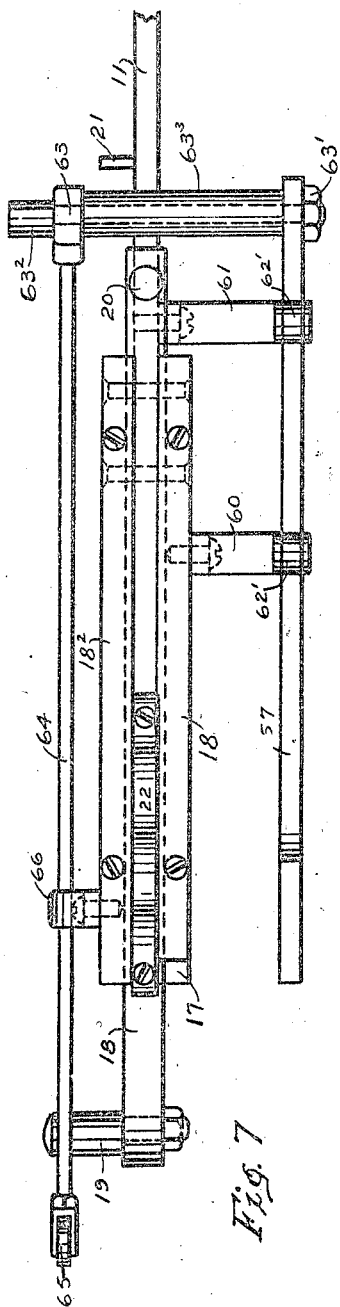
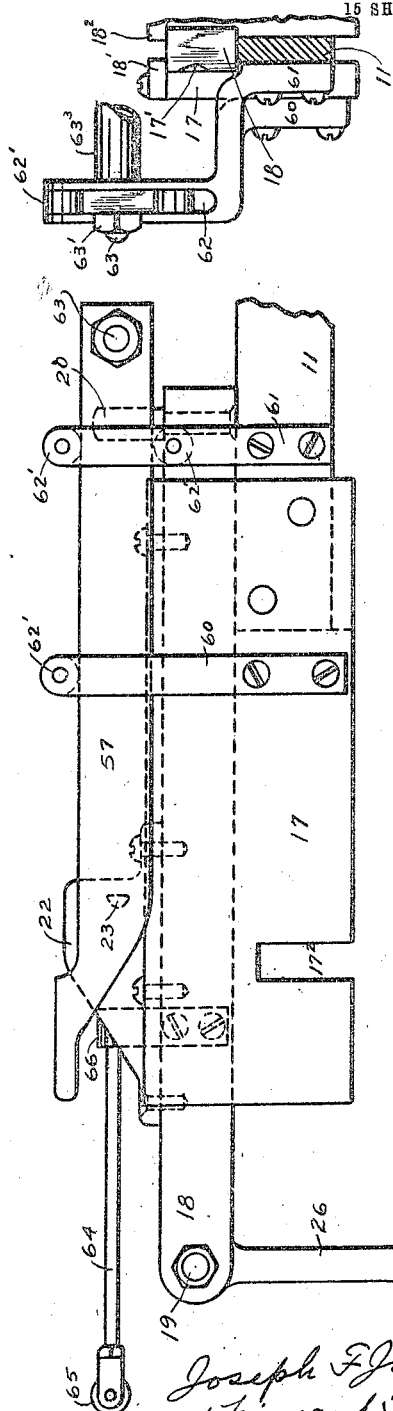
Witnesses
S. S. Matthes
Dorothy Wendland
Inventors
Joseph F Jirousek
and Nimrod T Plummer
By John H. Coss
their Attorney

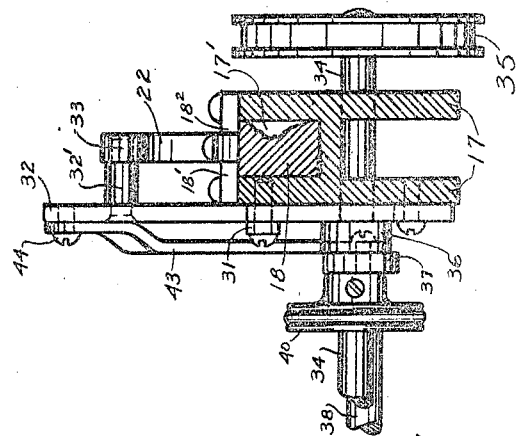
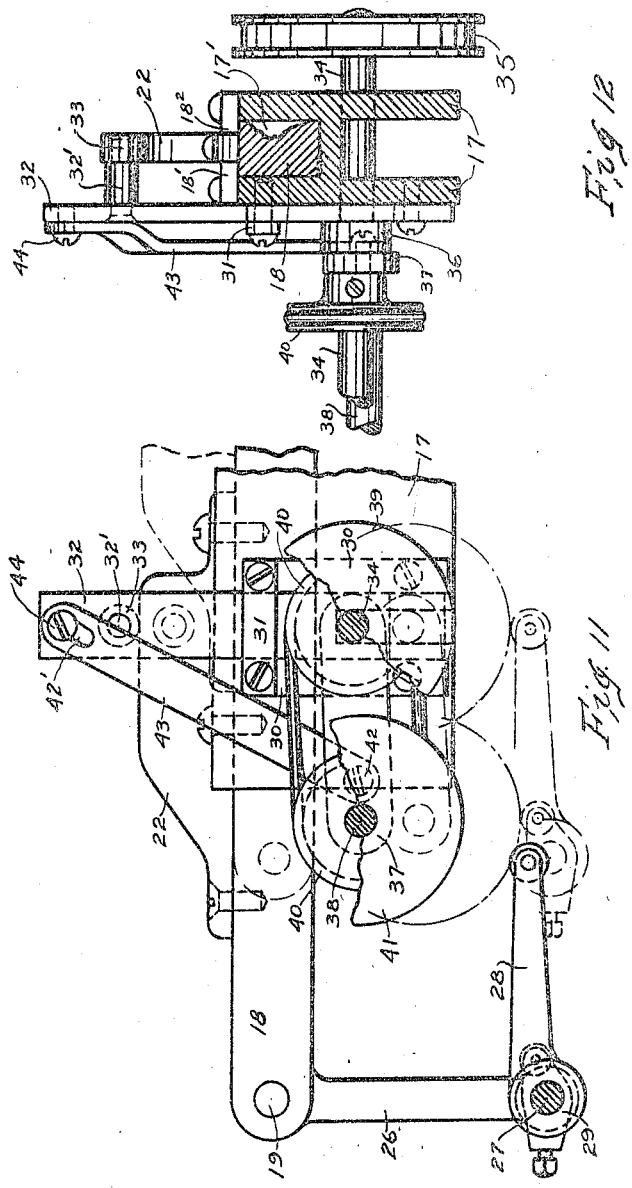
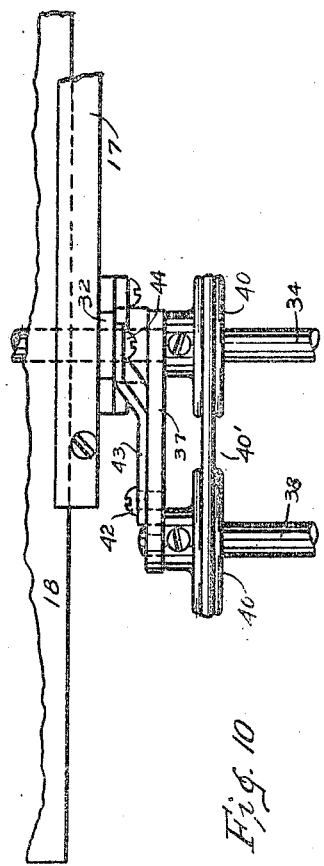

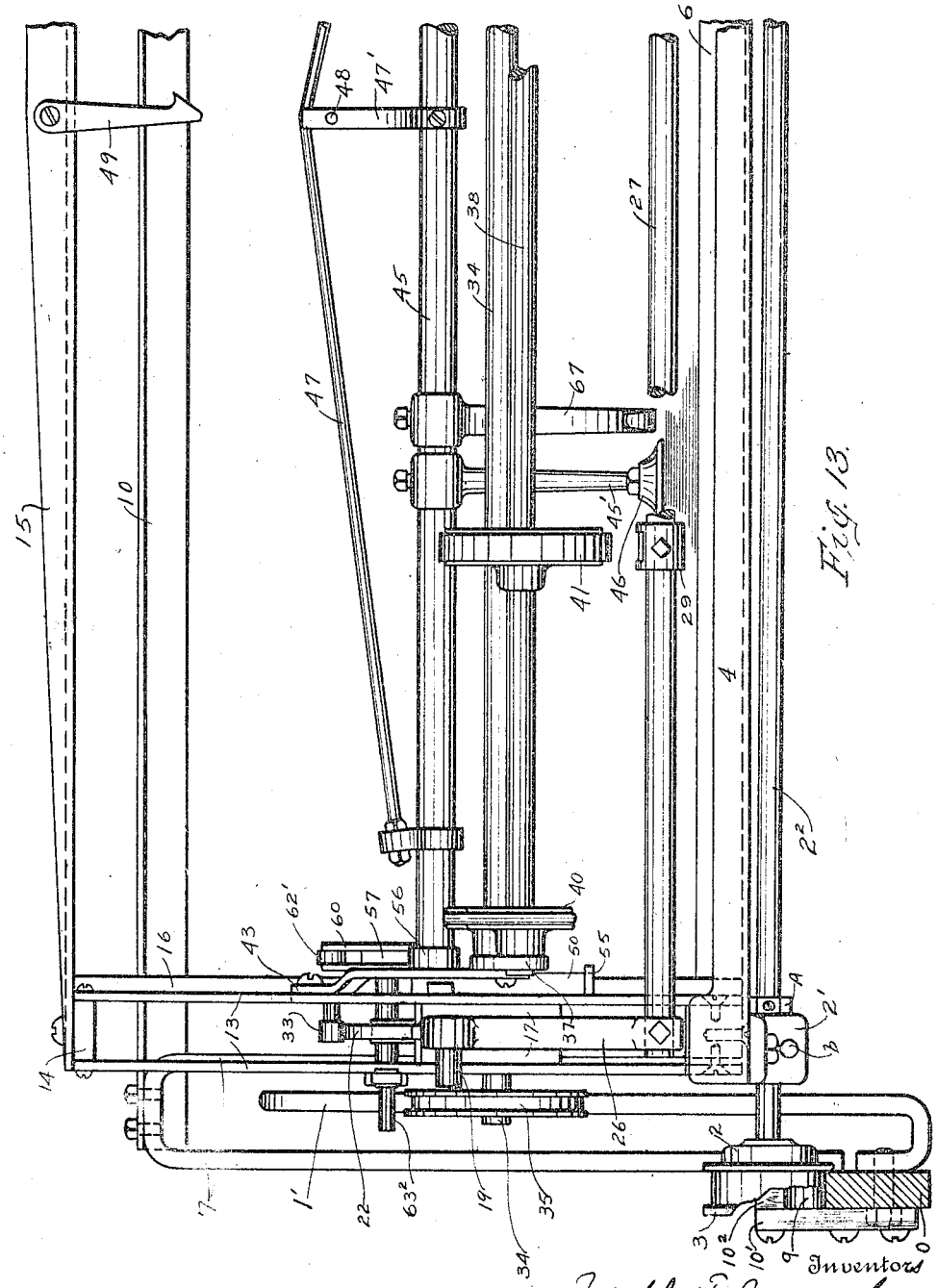

J. F. JIROUSEK & N. T. PLUMMER.
INTERLEAVING DEVICE.
APPLICATION FILED APR. 16, 1912.

1,069,787.

Patented Aug. 12, 1913.
15 SHEETS—SHEET 10.

Witnesses
S. S. Matthias
Dorothy Wendland

Inventors
Joseph F. Jirousek
and Nimrod T. Plummer
By John H. Boss
their Attorney

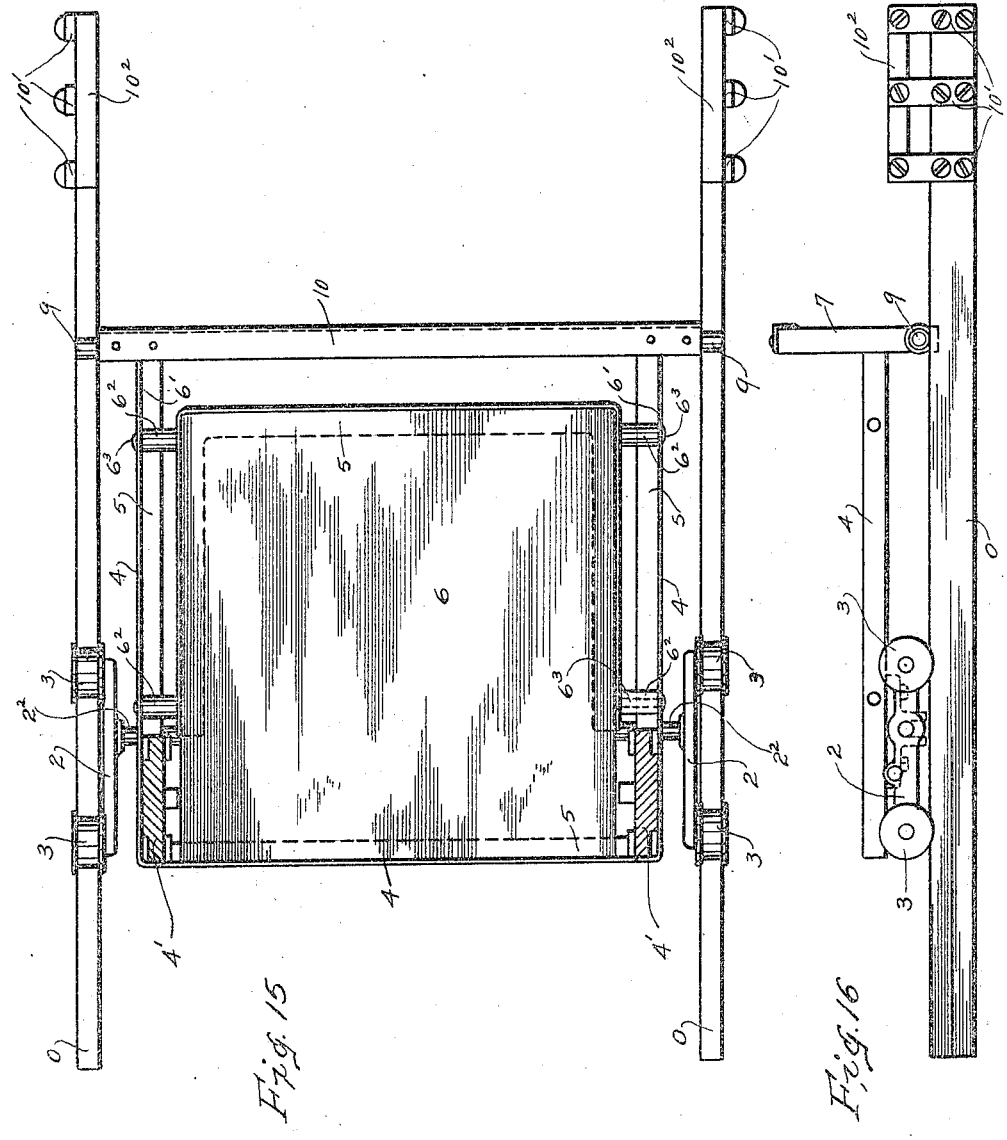

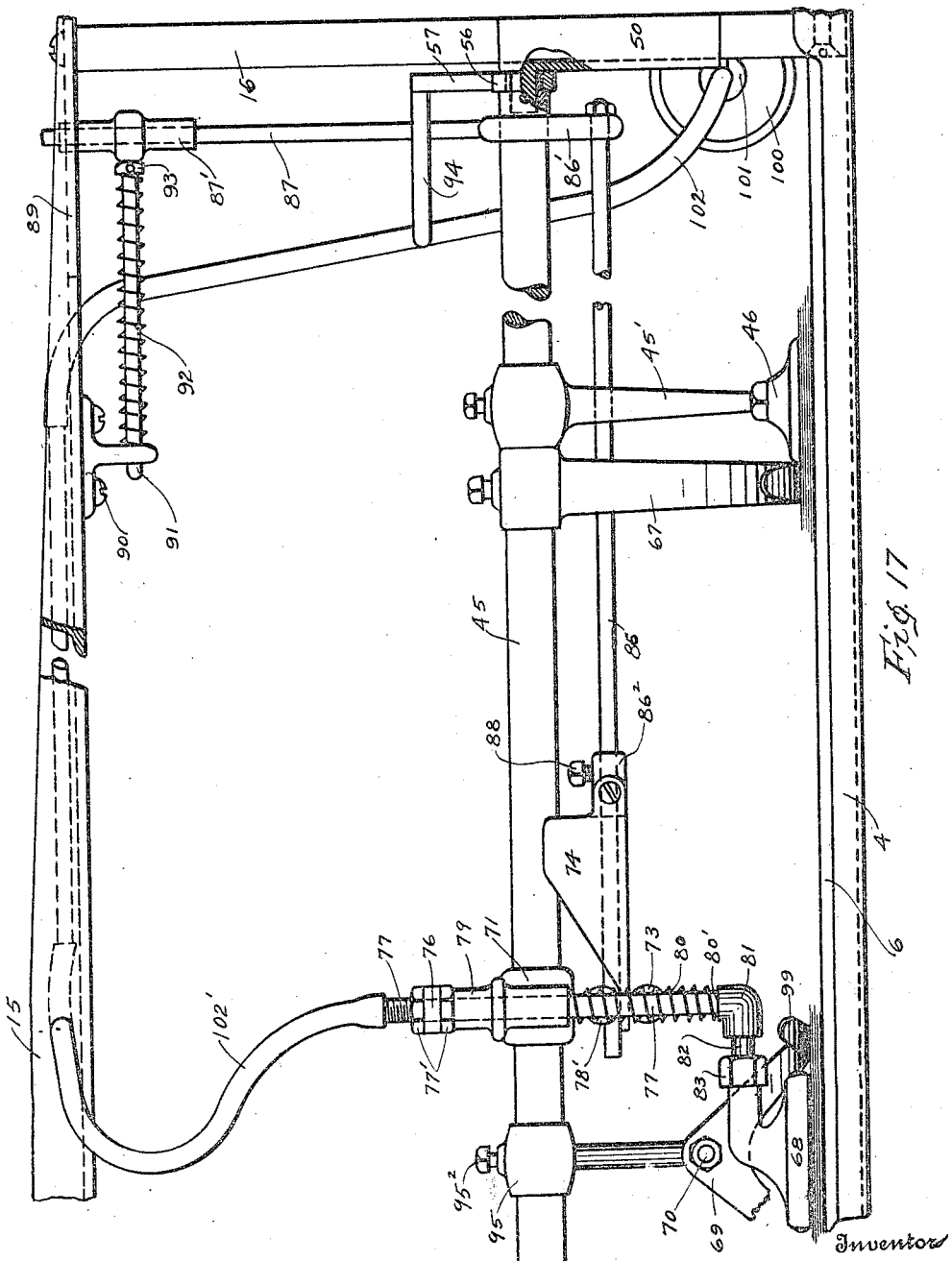

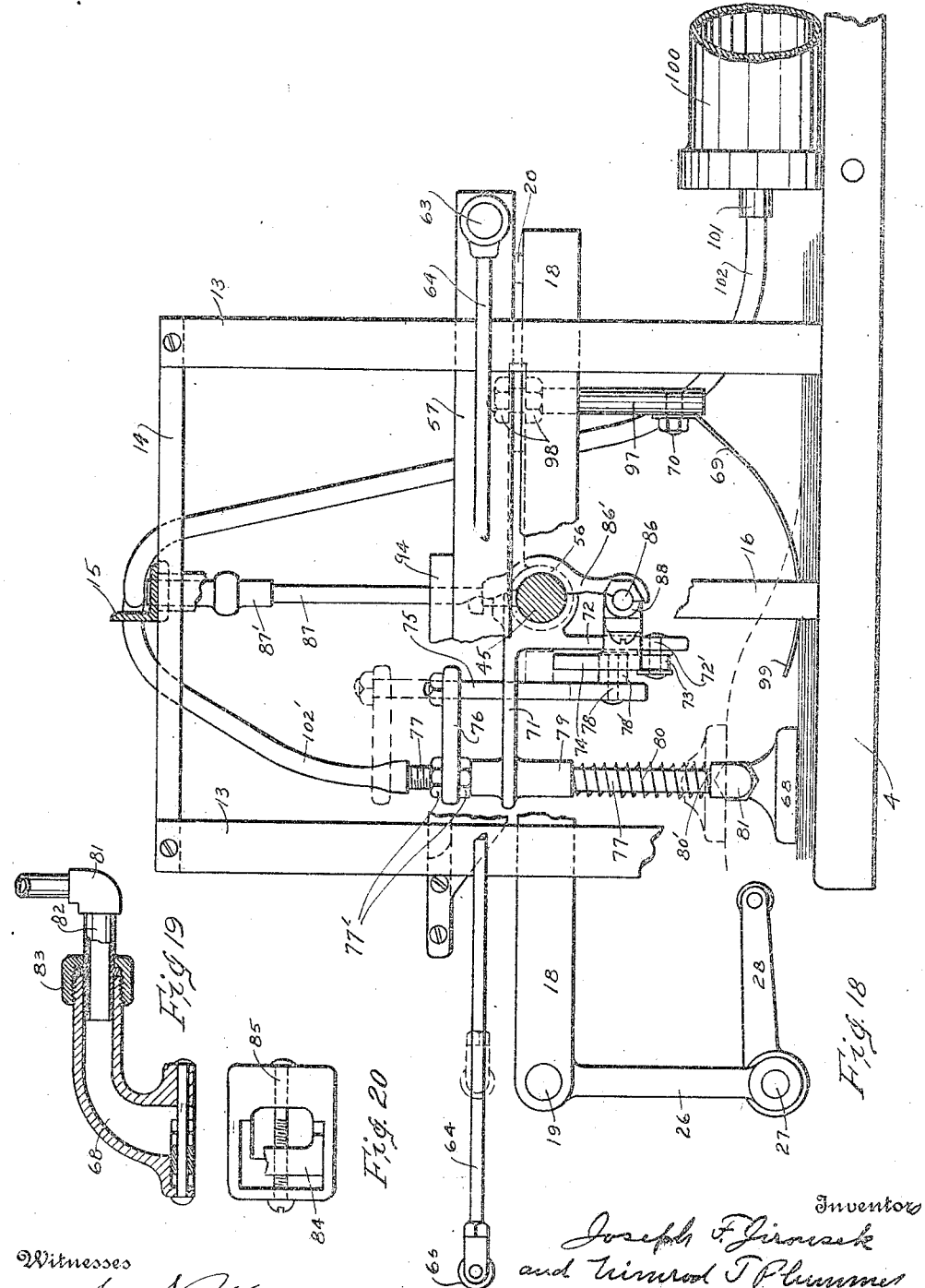

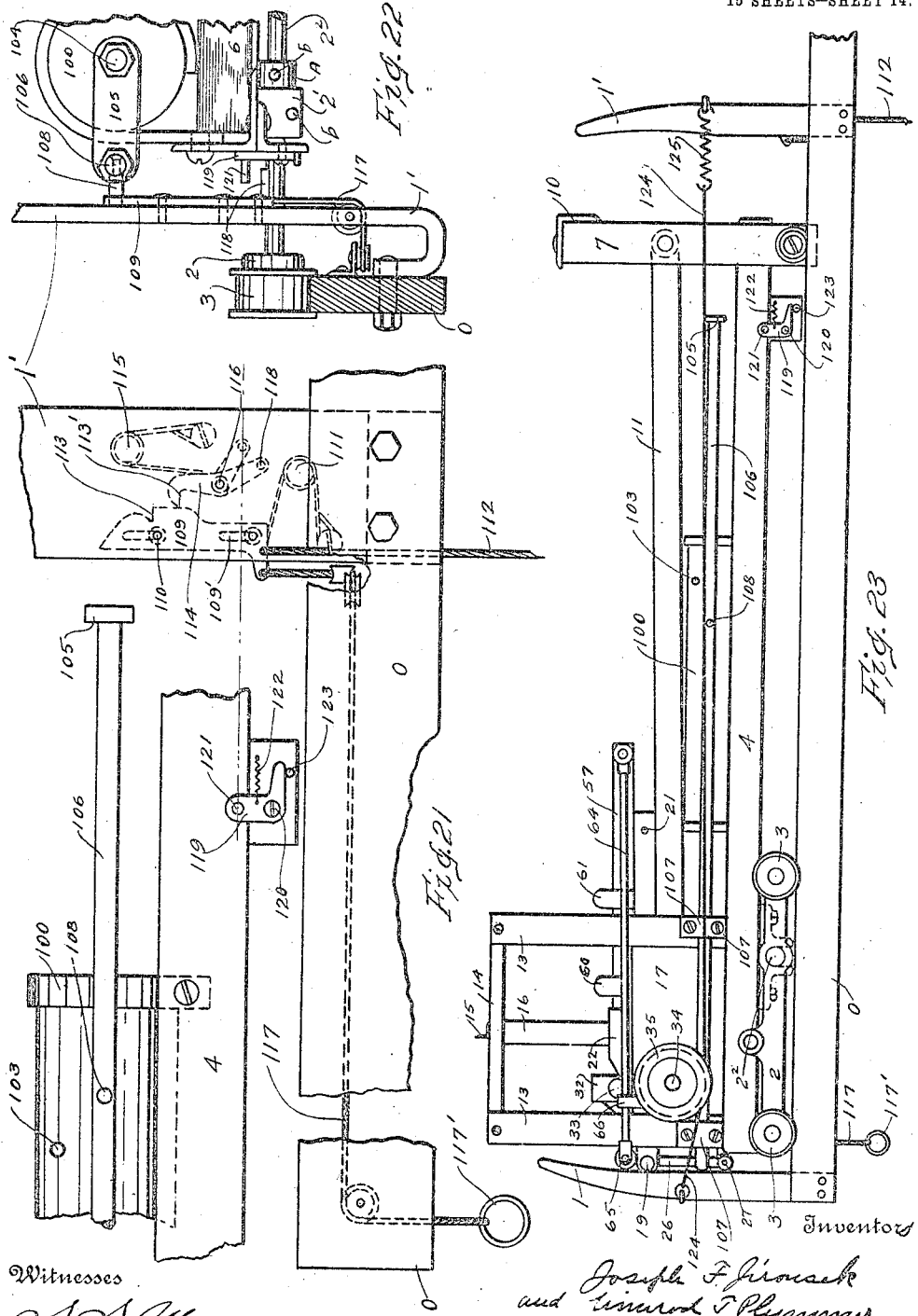

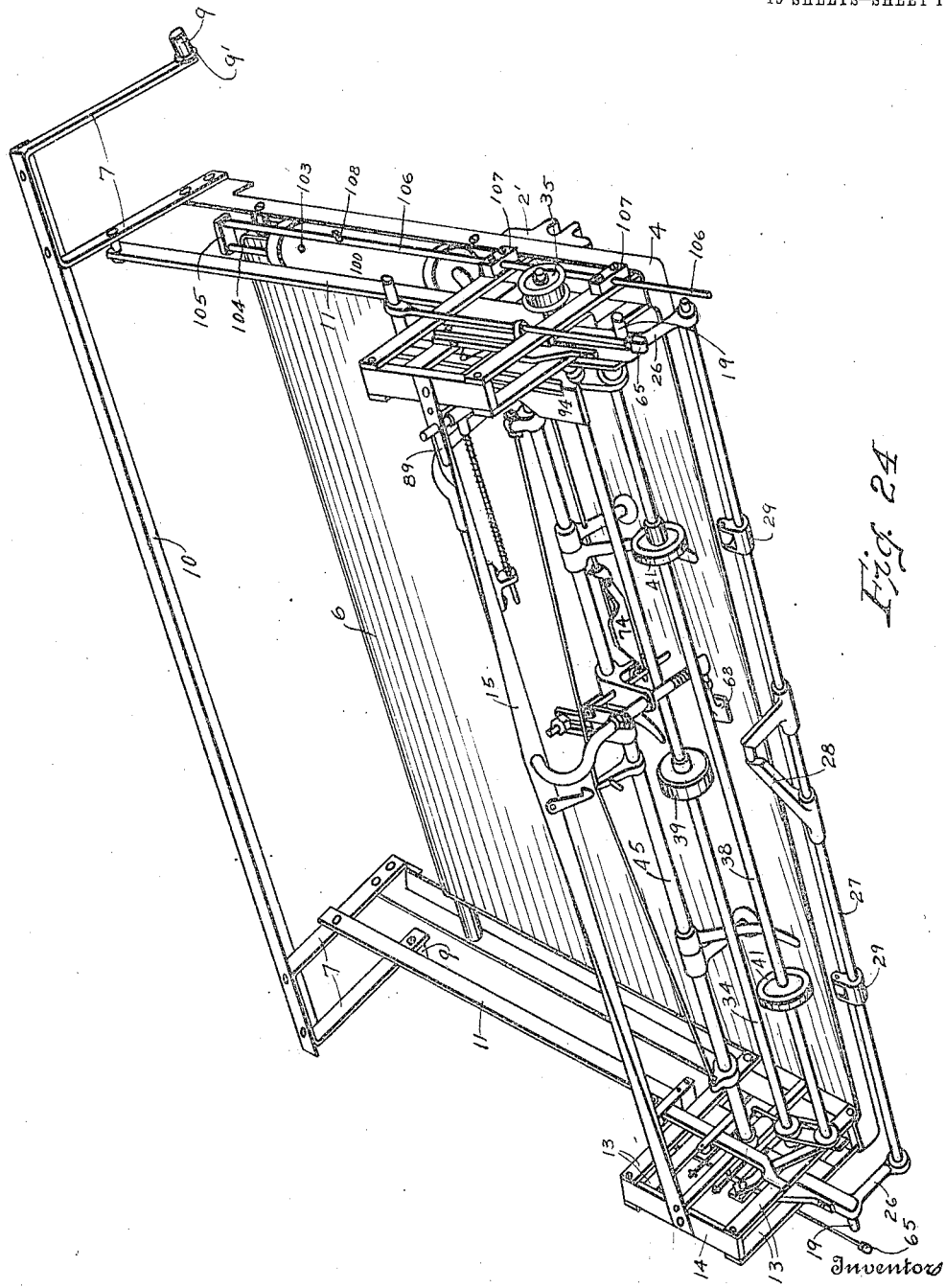

UNITED STATES PATENT OFFICE.

JOSEPH F. JIROUSEK AND NIMROD T. PLUMMER, OF SHELBY, OHIO, ASSIGNORS OF ONE-THIRD TO JOHN A. STROCK, OF SHELBY, OHIO.

INTERLEAVING DEVICE.

1,069,787.

Specification of Letters Patent.     Patented Aug. 12, 1913.

Application filed April 16, 1912. Serial No. 691,240.

*To all whom it may concern:*

Be it known that we, JOSEPH F. JIROUSEK and NIMROD T. PLUMMER, citizens of the United States of America, residing at Shelby, in the county of Richland and State of Ohio, have invented certain new and useful Improvements in Interleaving Devices, of which the following is a specification.

This invention relates to an interleaving device that can be used and readily attached or removed from a cylinder printing or lithographing press (or it can be arranged to be used with another machine) and is adapted to deliver a single sheet of paper from a pile upon a printed sheet, as it is delivered from the press or other device, thereby interleaving the sheets delivered from the interleaving device with the sheets delivered from the press or other machine.

The objects of the invention are to dispense with an extra operator, who in the present practice is required to interleave the sheets by hand manipulation, by providing means to interleave the sheets automatically; to increase the production of the press by increasing the speed of the press, which is accomplished and made possible because of the means provided for interleaving the sheets automatically instead of by hand manipulation; to provide means to deliver the sheets for interleaving purposes uniformly and accurately, thereby preventing any tendency of the sheets to move on the surface of the others as they are being delivered; to economize in floor space by making unnecessary the use of tables and other apparatus which are now used to support the sheets for interleaving purposes by hand manipulation; to provide automatic means for inserting either the original or duplicate sheet of a series of sheets for manifolding purposes, while the remaining sheet is being printed, thereby doing away with the bindery operation known as collating; to provide means of stopping the operation of the interleaving mechanism without affecting the operation of the press, and means to automatically throw the interleaving machine into operation; to provide means for the rapid attachment or removal of any device from the press; and means to relieve the pressman and feeder of the necessity of giving any attention to the interleaving process and of the interference with either in the performance of their duties by the interleaving operator.

The primary objects of this invention are to provide automatic means for interleaving sheets of paper derived from different sources with each other; said interleaving being accomplished in a more perfect, rapid and uniform manner than has heretofore been accomplished by hand manipulation, thereby saving time and labor, and producing a better quality of work.

This invention further consists of other novel features, details of construction and combination of parts which will hereinafter be more particularly set forth, illustrated in the accompanying drawings, and pointed out in the appended claims.

Figure 2:
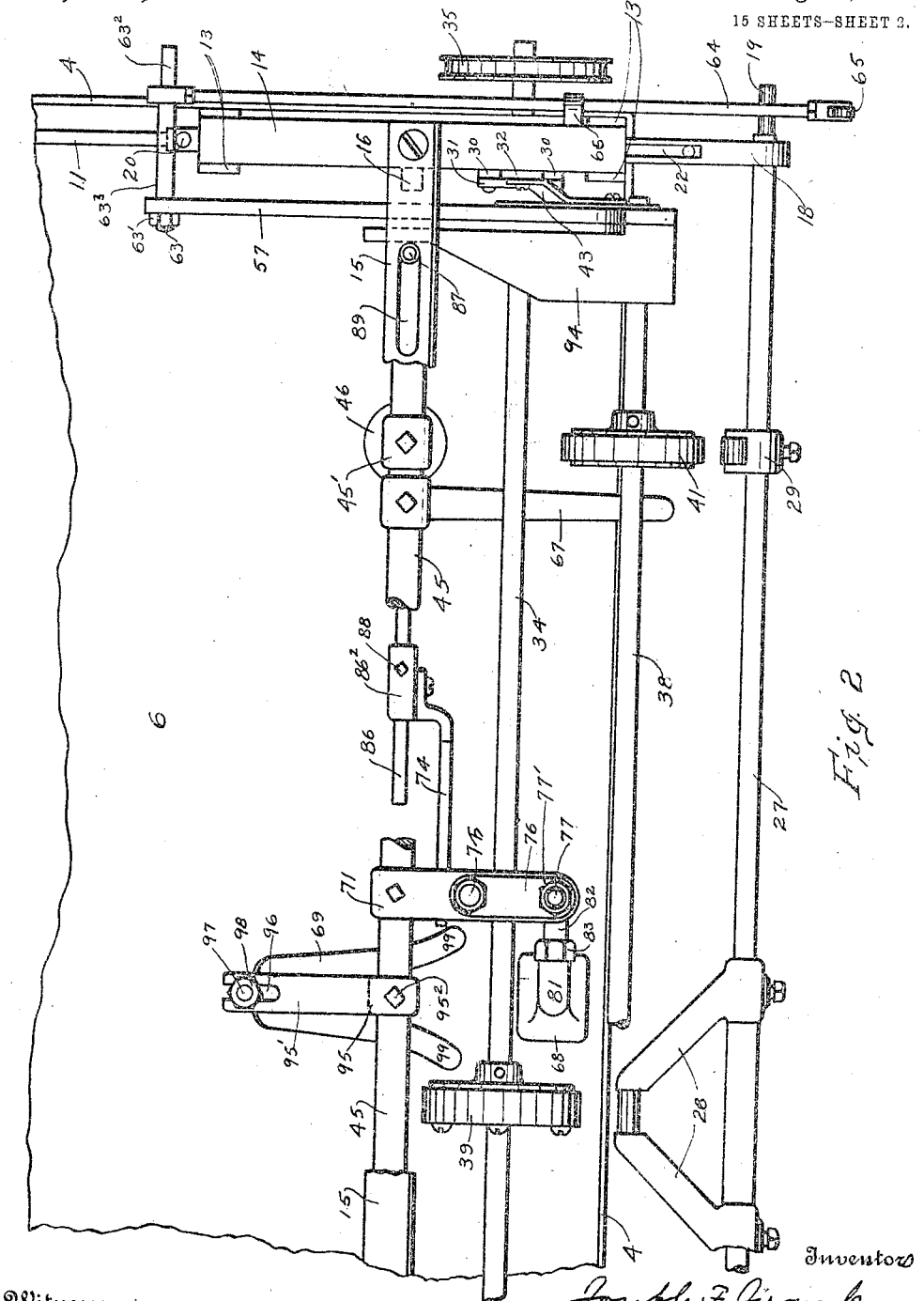
Figure 3:
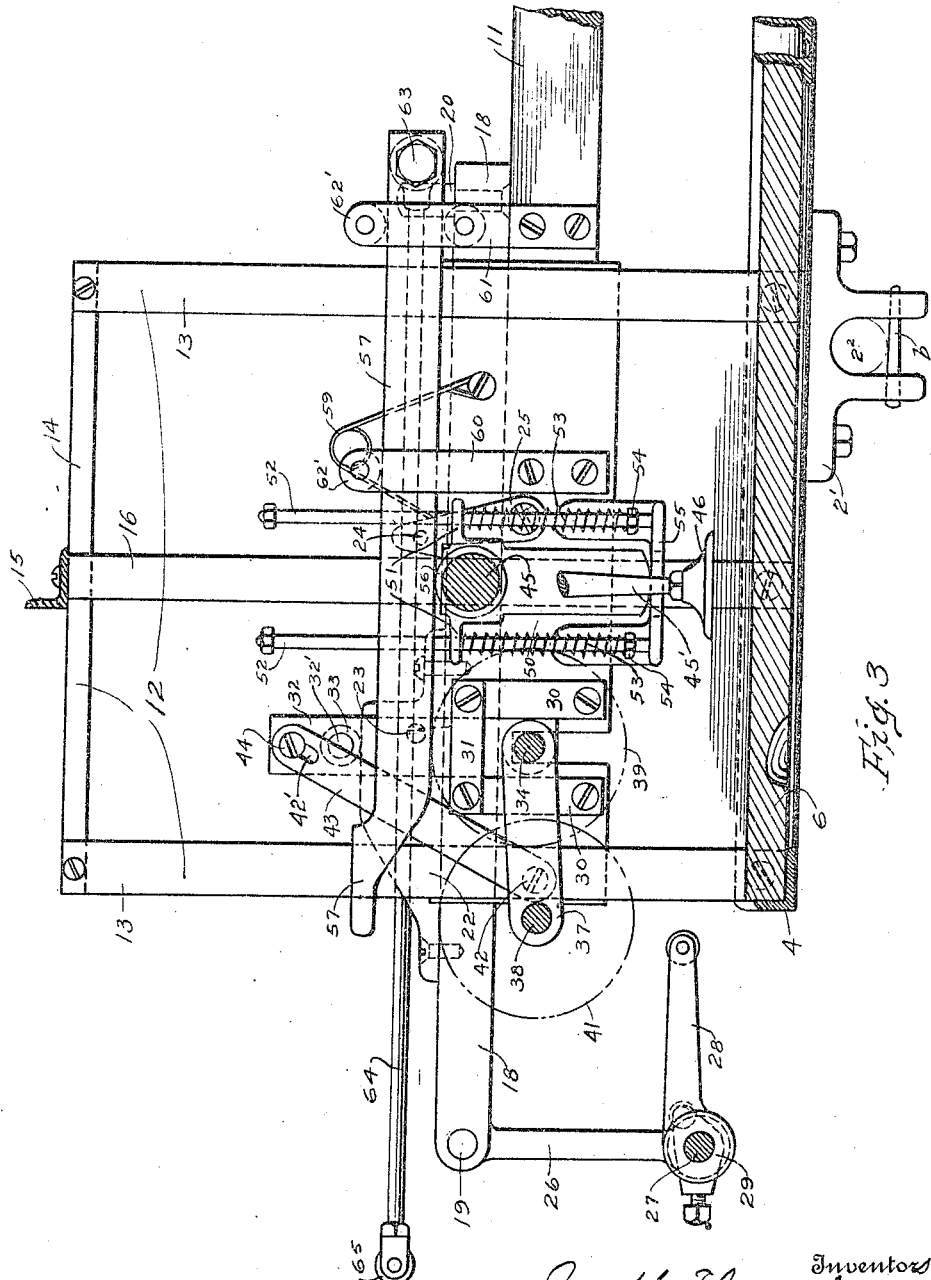
Figure 4:
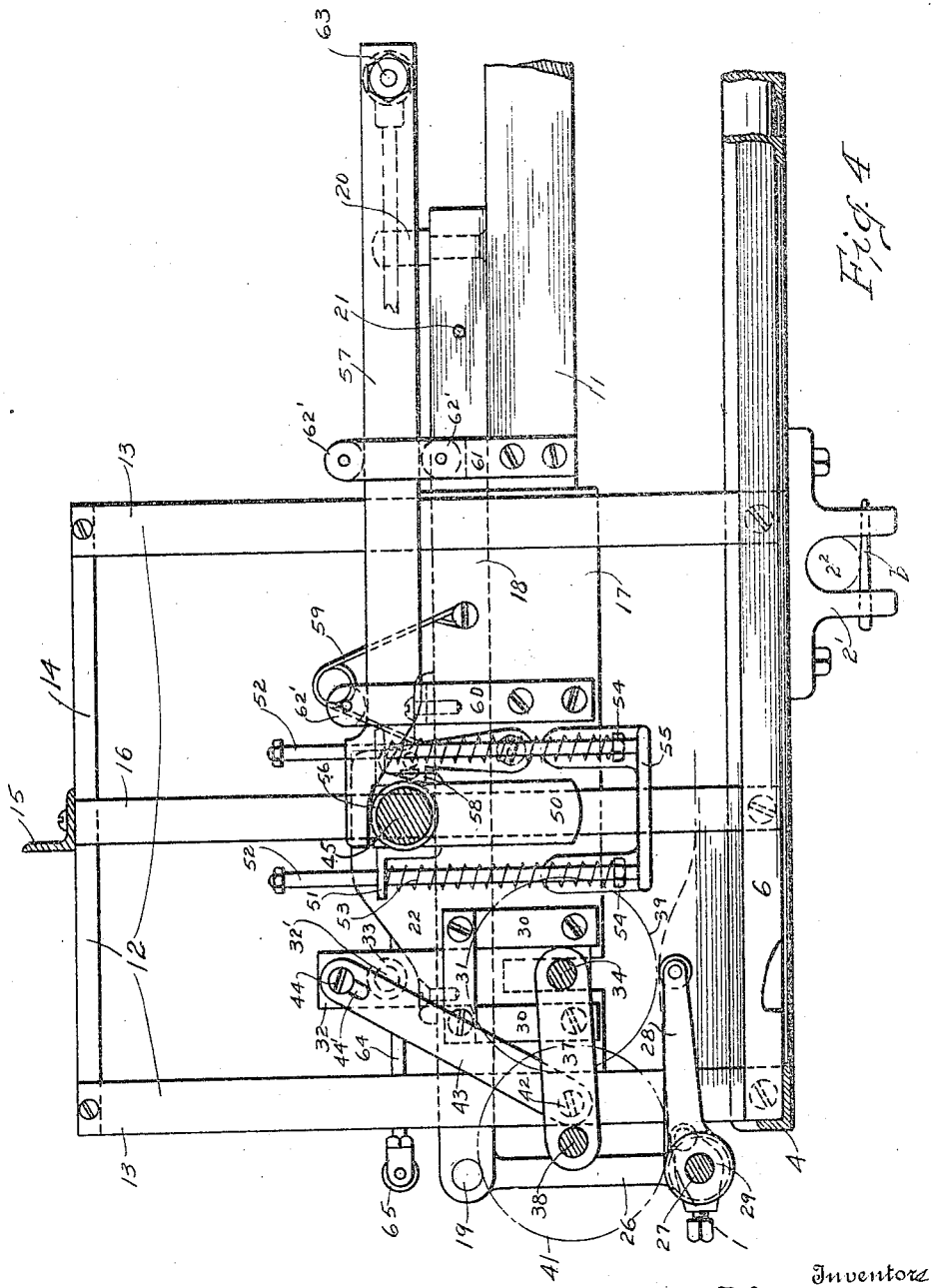
Figure 5:
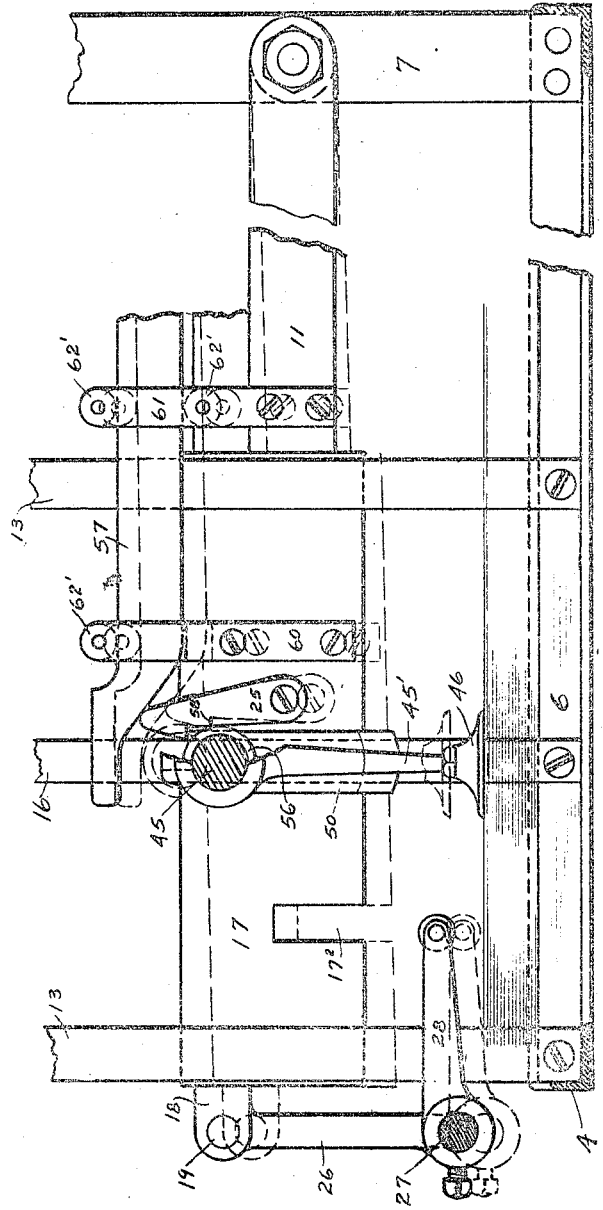
Figure 6:
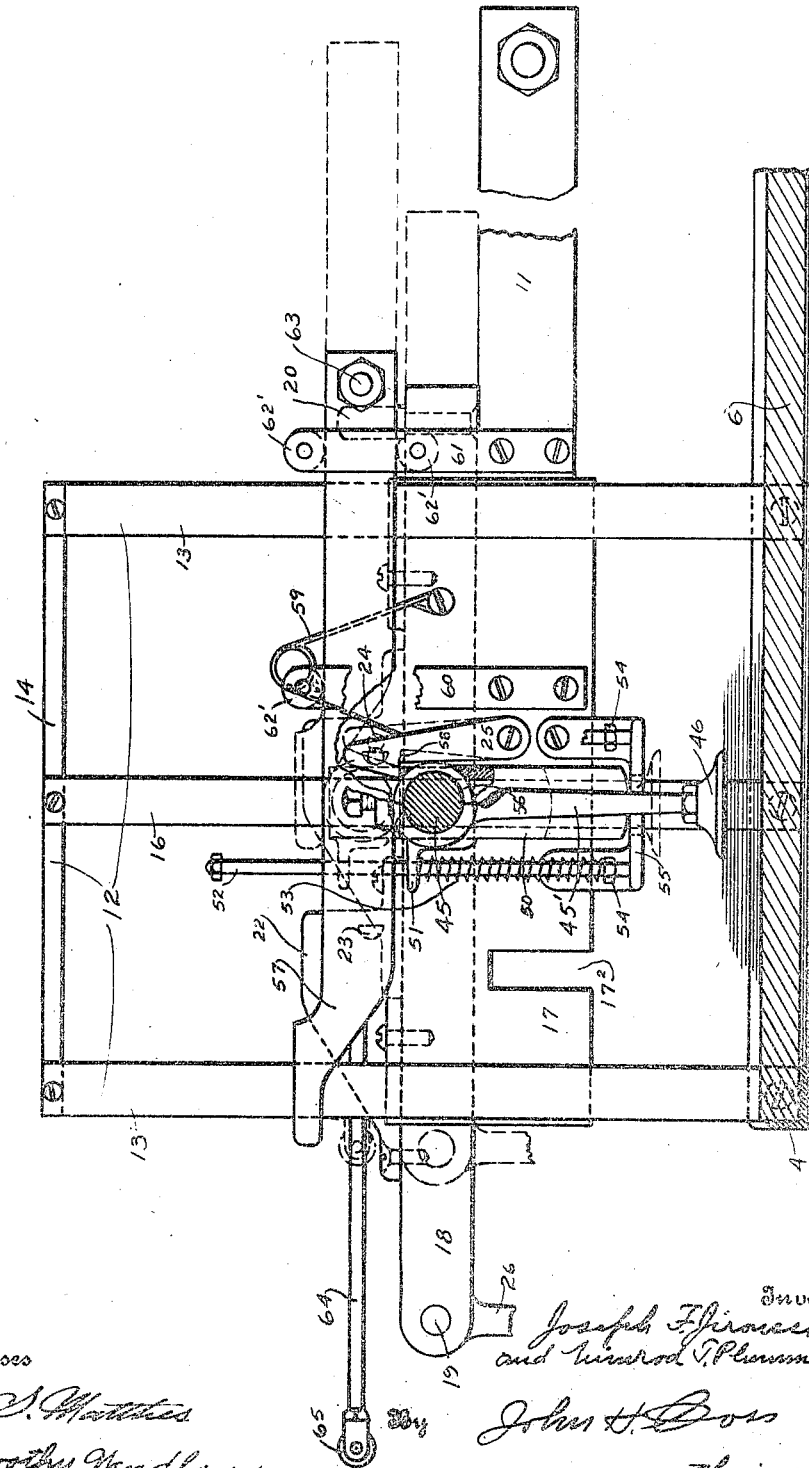
Figure 14:
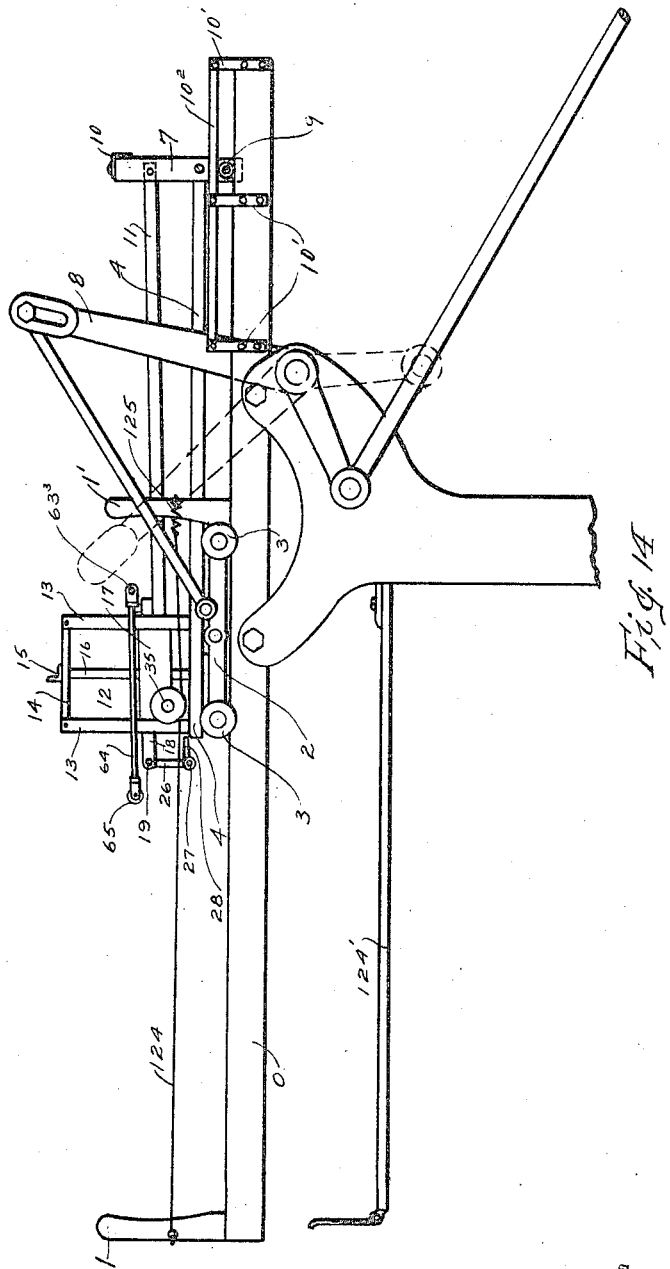

In the accompanying drawings, Figure 1 is a front end elevation of this device showing the feet of the supporting standards resting upon a pack of paper sheets used for interleaving, the device being upon its return travel after delivering a sheet upon a pack of printed sheets or the like. Fig. 2 is a plan view of the machine showing the right-hand section thereof and the means of regulating the suction of the pump in its application to the sheets of the pack of paper on the platform of the device. Fig. 3 is a side elevation of the left side of Fig. 1, viewed from the inside of the machine looking outward, and shows the relative positions of the parts when the device is at the terminus of its rearward travel and about to commence its forward travel. It also shows a side view of one of the standards and its foot supporting the operating mechanism on the pack of paper sheets. Fig. 4 is the same sectional view as shown in Fig. 3, showing the relative positions of the parts when the device is at the terminus of its forward travel and about to travel to its rearward terminus, and also showing the operating mechanism supported upon the pack of paper sheets through the medium of an extension finger support. Fig. 5 is a sectional view of the same side elevation as shown in Figs. 3 and 4 and shows the movement of the parts in transposing the weight of the mechanism from the feet of the standards to the extension finger support. Fig. 6 is a sectional view of the same side elevations as Figs. 3, 4 and 5, showing the movement of the cams, sliding bar, locking pawl, and movable standard mechanism in full and dotted lines. Fig. 7 is a plan view of the means used to support the sliding bar, cams, and operating mechanism. Fig. 8 is a side elevation of Fig. 7 showing the pivoted bar rigidly attached thereto. Fig. 9 is a front end view of Fig. 8. Fig. 10 is a plan view showing means for supporting one end of the primary and secondary delivery reel shafts and means of transmitting movement from one to the other. Fig. 11 is a side elevation of Fig. 10, showing in addition thereto, the means of raising and lowering the primary and secondary shafts which carry the reels and the inward and outward position of the extension and supporting finger. Fig. 12 is a front end view of Fig. 11. Fig. 13 is a front elevation of the left side of the machine showing the position of the primary and secondary delivery reels when elevated and the position of a standard and foot when depressed, showing the foot resting upon the pack of paper sheets. It also shows in detail the front elevation of the parts shown in Figs. 2 to 12 inclusive, and means of movably supporting the device on the track. Fig. 14 is a side elevation of the device, showing its application to a specific type of press and the application of power to impart the necessary reciprocating movement thereto. Fig. 15 is a plan view, showing the construction of the frame, the trucks carrying the frame and the paper platform carried by said frame. Fig. 16 is a side elevation of Fig. 15. Fig. 17 is a sectional front elevation of the device, showing the suction foot in contact with the pack of paper and the operating mechanism for imparting vertical movement to said suction foot. It also shows the method of connecting the suction foot to its operating mechanism and the pump. Fig. 18 is a side elevation of Fig. 17, showing both positions of the suction foot, one in full lines and the other in dotted lines. The one in dotted lines showing one sheet of paper withdrawn from the pack of paper by the suction communicated thereto from the pump, and the one in full lines, showing the suction foot in contact with a pack of paper. Fig. 19 is a sectional view of the suction foot, showing a valve mechanism applied thereto to regulate the amount of suction. Fig. 20 is a plan view of the bottom of the suction foot shown in Fig. 19. Fig. 21 is a side elevation of the trip mechanism which is secured to the stop bar 1'. The operation of the trip mechanism being shown in dotted lines. Fig. 22 is an end view of Fig. 21. Fig. 23 shows the method of communicating rotary motion to the reels by a pulley and cable and an outline of the whole device assembled and mounted upon the tracks. Fig. 24 is a perspective view of the device, showing the arrangement and location of the parts when assembled and ready to be mounted upon the tracks.

The device as shown is preferably constructed to operate in connection with a printing press which delivers the printed side of a sheet of paper upward and in its operation requires a track on each side extending to a point slightly beyond the delivery table or platform at the front of the press, one form of which is shown in Fig. 14.

In the description of the device, one side only will be described as it will be understood that both the right side and left side are exact duplicates of each other (see Fig. 1) except that on the right side of the device an operating mechanism is attached for operating a pump and regulating the suction thereof; also means for regulating and operating the suction foot. What is herein designated the right-hand side of the machine is to the right side of person, looking at the machine as shown in Fig. 1 of the drawings.

In the accompanying drawings, reference numerals 0—0 represent the tracks upon which are rigidly secured at the forward ends, vertical stop bars 1—1; and at their rearward ends, vertical stop bars 1'—1'. Upon the tracks a carriage 2 is mounted which is supported by flange pulleys 3—3, the flanges of which depend on each side of the track to prevent undue lateral movement. It will be noted that the pulleys are secured to the forward end of the frame 4 and support its front end. The rear end being suppported in a manner which will be described hereinafter. It will, of course, be understood that means are provided to reciprocate the carriage and the mechanism mounted thereon, upon the tracks between the vertical stops hereinbefore described. One means being shown in Fig. 14 of the drawings.

In order to provide means for quickly attaching or removing the device from the carriage, an inverted U-shaped lug 2' is attached on each side of the bottom of the frame 4. The U-shaped lugs engage the tie-rod 2² which connects both sides of the carriage 2. On this tie-rod, collars A—A are secured and held in place by set screws to prevent movement of the device in a lateral direction.

In order to prevent the device from vibrating or moving in a vertical direction, a pin $b$ is inserted in a suitable aperture formed in the U-shaped lug and it is adapted to contact slightly with the tie-rod 2², thereby preventing vibrating or upward movement of the U-shaped lug and the mechanism carried thereby. (See Figs. 1, 4 and 14.)

The frame 4 is preferably constructed rectangular in form and of any required size and is made of angle iron for the purpose of adding strength and rigidity thereto. The portions 5 of the frame 4 form supporting ledges for the means that carry the feed board 6. A frame 6' is supported by the ledges 5 of the frame 4 through the medium of the trunnions 6² which are fastened to both frames 4 and 6' by the bolts 6³. Attention is called to the fact that the feed board is removable and any number of boards may be provided on which a pack of paper comprising a pack of sheets may be placed in the proper position and when one pack is exhausted, another pack can be placed in position without unduly delaying the operation of the press and the device in performing the interleaving operation. The rear end of this frame 4 is preferably supported by yokes 7 which extend down to the track at which point the yokes are supported by the flange rollers 9 which travel on the tracks and support the rear end of the carriage upon which the device is mounted. These yokes are connected by an angle bar 10 which retains the yoke on both sides in their proper position and gives rigidity to the yokes when subjected to strain in the operation of the device.

Lateral movement of the rear end of the carriage is prevented by the flanges 9' of the rollers which rotate and travel adjacent to the inside of each track. When the device is made to travel rearwardly on the tracks 0—0 to its rearward terminus and the different parts are engaged by the vertical stop bar 1', there is a tendency for the carriage to tip upward at its rear which is caused by the resistance of the vertical stop bar 1' to the movement of the carriage.

In order to overcome the tendency to tip and hold the carriage on a plane with the tracks at the rear end, two or more vertical bars 10' are attached to the outside of the tracks and to the tops of these vertical bars, a horizontal bar 10² is secured which is placed parallel with the top of the track and the proper distance above it to permit the rear flange pulleys 9 to travel between the horizontal bar and its respective track. (See Figs. 14, 16 and 23.) The horizontal bar is made of sufficient length to maintain the flange pulley 9 between the track 0 and itself during that part of the travel of the carriage (and the mechanism mounted thereon) that part of the mechanism is being resisted by the vertical stop bar 1'.

At a pre-determined point on the inner leg of each yoke 7, an arm 11 is pivotally connected with its free end extending forward and rigidly connected to the rear end of a box 17 hereinafter described. The object of this arm, (one of which is located on each side of the device) is to permit the raising and lowering of the operating mechanism of the device, simultaneously, and its proper adjustment to the varying height of the pack of paper sheets caused by the removal of the sheets by the device for interleaving.

On the front end of each side of the frame 4, a framework 12 is provided each consisting of four vertical bars 13 spaced apart and arranged to permit of the insertion between them of a box or boxes carrying sliding mechanism. The upper ends of these bars 13 are spaced apart and attached together by means of a bar 14 which forms a top for the framework, and the lower ends of the bars 13 are rigidly secured to the frame 4 and the block 4'. The framework on each side, just described, is connected together by an angle iron bar 15 which is securely attached to the bars 14 forming the top of the framework 12. The angle bar 15 is also used to support portions of the operating mechanism of the device and for holding the whole of the mechanism at its highest point in order to afford space for replenishing the pack of paper sheets on the feed board. Vertical guide bars 16 are secured on the inside of the framework on each side of the machine, one end being attached to the horizontal bar 15° and the other end being attached to a block 4' which is secured to the frame 4.

A supporting box 17 which is provided with a longitudinal groove 17' and a vertical slot 17² is fitted within the vertical bars of the framework 12 in such a manner as to permit of vertical sliding movement. In the longitudinal groove 17', formed in the box 17, a horizontal sliding bar 18 is inserted which projects beyond each end of the box. Adjacent to the forward end of the sliding bar 18, a stud 19 is secured extending outwardly in a horizontal direction, which is adapted to engage the vertical stop bar 1 when the device reaches a pre-determined point in its forward travel. In order to keep the sliding bar 18 within its proper place in the longitudinal groove, two bars 18' and 18² are secured to the box 17 with their inner edges extending over the top of the sliding bar 18.

On the top and adjacent to the rear end of the sliding bar, a stud 20 is secured through the medium of which forward motion is communicated to the sliding bar 18 when it contacts with the stud 63, at a pre-determined point of the rearward travel of the device. On the outside of the rear end of the sliding bar 18, a pin 21 is secured and adapted to contact with the bar 13, thereby preventing the sliding bar 18 from moving too far forward. On the top of the sliding bar 18, a cam 22 is secured for raising and lowering the delivery reel mechanism. Adjacent to the rear of the cam 22, a pin 23 is secured which engages a similar pin 24 secured to the pivoted pawl 25.

On the inside of the front end of the sliding bar 18, an arm 26 is attached or made integral, with the sliding bar 18 which depends in a downward direction and in the lower end of which the supporting shaft 27 is secured, on which is carried the primary extension finger 28 which rests upon the pack of leaves and it also carries the weight of the mechanism when the device is on its rearward travel and the secondary reel supports 29, which support the reel mechanism. The reel supports and extension finger are constructed in such a manner as to be readily adjustable either laterally or around the shaft 27. In the end of these supports and extension finger, rollers are journaled which contact with the delivery reels and impart movement to the sheet and obviate undue friction. To the top of the inner side of the box 17, two vertical bars 30 are attached, spaced apart and held together upon the upper portion by a horizontal bar 31. The three bars in connection with the side of the box 17 form a guide-way in which the supporting reel bar 32 operates vertically when movement is imparted to it by the cam 22. Near the top of the supporting reel bar 32, a stud 32' is secured upon which a roller 33 is mounted and when riding on the cam 22 raises or lowers the reels and their mechanism.

In the lower end of the supporting reel 32, a bearing is provided to journal one end of the primary reel shaft 34. Attention is called to the fact that this shaft extends on each side beyond the framework 12 and on each end a sheave driving pulley 35 is mounted. On the shaft 34, a collar 36 is mounted adjacent to the primary reel supporting bar 32 and at the side of this collar, a horizontal bar 37 is secured, the forward end of which is provided with a bearing to journal the secondary reel shaft 38. The primary reel 39 is adjustably mounted on the primary reel shaft 34 preferably adjacent to the center thereof. The secondary reel shaft 38 on one end is mounted in a bearing formed in the front of the horizontal bar 37 and is held in place by the driven sheave pulley 40 placed at each end of the shaft 38 and contacting with the bar 37. A sheave pulley 40 is also mounted on the shaft 34 and alined with the pulley 40 on the shaft 38. Movement is thereby transmitted from the primary shaft 34 to the secondary reel shaft 38 by means of belts 40' or any other well known means of transmission. On the secondary reel shaft 38, reels 41 are adjustably mounted. It will be seen that the primary delivery reel 39 is designed to operate on the center of the sheet about to be delivered, and the secondary delivery reels 41 near the sides of the sheet, all of the reels being adjustable sidewise on the shafts to accommodate different widths of a pack of sheets. The horizontal bar 37 has a bolt 42 secured to its forward end to which a bar 43 is attached at one end and its opposite end attached by a bolt 44 supporting the free end of the bar 37.

The above described mechanism provides means of movably suspending both the primary and secondary reel mechanism. By providing a slot 42' in the bar 43, the secondary reel shaft 38 can be adjusted up or down to give the desired pressure of the secondary reels 41 on the secondary reel supports 29, in order to insure the proper delivery of the sheet. In other words, the pressure between the supports and the delivery reels can be varied to suit the weight, kind or condition of the sheets of paper.

At the rear of the primary reel shaft 34, a vertically movable rod 45 is secured which carries the standards 45', which in turn carry adjustable presser feet 46. The rod 45 also carries the sheet lifting mechanism consisting of the suction foot, the mechanism for operating it and other parts of the device. The rod 45 may be constructed of any desired form that shown in the drawings being round and braced by a truss 47. In the pillar 47' which is carried by the rod 45, a stud 48 is secured and is adapted to engage a catch 49 which is maintained to swing on a pin secured to the front side of the horizontal bar 15, and when connected to the pin, supports the operating mechanism of the device when raised to its highest point, thereby giving access to the feed board and the pack of sheets of paper carried by the feed board.

On each end of the rod 45 a vertical sliding member 50 is secured and is formed channel shape to embrace a vertical guide bar 16. On the front and back of the vertical sliding member 50, horizontal projections 51—51 are provided, extending forward and backward. These projections are provided with suitable apertures through which the rods 52 are passed carrying springs 53, and adjusting nuts 54 surround the rods 52. Extending on each side of the vertical bar 16, a support 55 for the bolts 52 is provided which is attached to the box 17, and extends downward below the vertical sliding member 50.

Attention is called to the fact that the springs 53 are interposed between the horizontal projections 51 and the support 55, exerting a pressure upward against the horizontal projections and normally holding the rod 45 and the vertical sliding member 50 (when not restrained) in their upward positions. Adjacent to the vertical sliding member 50 on the rod 45, a cam roller 56 is provided which eliminates part of the friction caused by the sliding movement of the cam 57 when actuated to force the rod 45 to its lower position.

The locking pawl 25 is pivotally attached to the inner side of the box 17 and is formed in such a manner that when the vertical sliding member 50 is pushed down, the lip 58 of the locking pawl 25 engages the top of the vertical sliding member 50 and retains it in position on the vertical bars 16 against the compression of the springs 53, thereby supporting the weight of the operating mechanism through the standards and presser feet which are then resting upon the pack of paper. The pivoted locking pawl 25 is yieldingly held against the vertical sliding member 50 by the spring 59 which normally forces the pivoted pawl in contact with the vertical sliding member, preparatory to engaging the top of the vertical sliding member when forced downward to permit the lip of the locking pawl to engage therewith.

At a point on the outer side of the pawl 25 and in a line to engage a pin 23 on the side of the cam 22, a pin 24 is secured. On the inner side of the box 17 and on the inner side of the pivoted arm 11, brackets 60 and 61 are attached. The brackets are provided with slots 62 in which rollers 62' are mounted and spaced apart to form a slideway through which the cam 57 operates. The front of the cam 57 is formed in such a manner that when the cam is pushed backward to the proper position the upper portion of the cam projects over the cam rollers 56 and when pushed forward, it forces the vertical sliding member 50 downward, compressing the springs 53 until the upper portion or top of the vertical sliding member 50 is engaged by and held down by the lip 58 of the pawl 25.

It will be noted that the roller bearings 62' are so arranged in the slots formed in the brackets 60 and 61 that together they form a slideway which retains the main cam 57 firmly in its proper position and at the same time permits the cam to slide freely and without friction in a horizontal direction. At the rear end of the cam 57, a stud 63 is secured which extends outwardly and in a horizontal direction far enough to permit it to engage the vertical stop bar 1' when the device has traveled in a rearward direction a pre-determined distance.

As the adjustment of the parts must be quite accurate with reference to their contact with the vertical stop bars, it is deemed preferable to enlarge the stud at the end 63² and form it eccentric at the point it comes in contact with the stop bar. The enlarged part of the stud 63² acts as a head and contacts with the side of the rod 64. The stud 63 is attached to the rod 64 which extends forward along the outer side of the framework 12 and is provided on its free end with a roller 65 which is adapted to engage the vertical stop bar 1 on its forward travel. The cam 57, stud 63, and rod 64 practically form a yoke. The opposite end of the stud is provided with a thread to engage the nut 63' which when tightened securely holds the cam 57 and rod 64 in close contact with and between the ends of the sleeve 63³. The rod 64 is supported on one end by passing it through a supporting bearing 66 which is attached to the outer side of the box 17.

The presser feet 46 are so arranged that they can be adjusted in a lateral or vertical direction for any purpose desired. The guides 67 are mounted on the bar 45 in close proximity to the presser feet 46 and extend in a forward direction under both of the reel shafts to keep each sheet of paper as it is drawn from the pack of paper sheets, traveling in its proper course. A loop forming mechanism for the sheet consists of a suction foot 68, loop regulator 69, held by a bolt 70, and the suction pump 100. On the rod 45 near its center, a bracket 71 is adjustably secured for supporting the suction foot and its operating mechanism.

From the bracket 71 in front of the rod 45, an arm 72 is suspended and in the lower end of said arm a pin 72' is inserted carrying a flanged roller 73 which supports one end of the suction foot cam 74. In the bracket 71 an aperture is provided to receive a vertical guide rod 75. The upper end of said rod is connected by an arm 76 to the suction foot tube 77. To the vertical guide bar under the suction foot bracket arm 71, a pin 78 is attached carrying a cam roller 78'.

It will be noted that the flanged roller 73 is stationary while the cam roller 78' is movable by the cam in a vertical direction. When the suction foot cam 74 is pushed between said rollers, the cam raises the vertical guide bar 75 and elevates the suction foot 68, and when the cam is withdrawn from between the rollers, the suction foot 68 is lowered. The suction foot tube 77 is adjustably held in place by lock nuts 77' which are placed above and below the arm 76 by means of which the suction foot tube can be adjusted vertically.

In the front end of the bracket 71, a sleeve 79 is inserted in a suitable aperture provided therein to act as a keeper and guide for the suction foot tube 77. A coil spring 80 surrounds the suction foot tube and is interposed between the sleeve 79 and a shoulder 80' on the suction foot. The torsion of said spring being exerted in a downward direction to hold the suction foot firmly against the pack of paper sheets. On the lower end of the suction foot tube 77, an elbow 81 is connected from which a flanged coupling 82 is connected to the suction foot by a nut 83 which permits the adjustment of the suction foot around the coupling 82, or in other words, the suction foot can be adjusted at an angle with reference to its connection to the elbow. The opening in the bottom of the suction foot 68 may, if desired, be constructed with a slide valve 84 operated by a screw 85 passing through the suction foot and threadably connected to the slide valve. By turning the screw 85 the slide valve is opened or closed, thereby regulating the amount of suction of the pump as applied or exerted upon a sheet of paper.

Underneath and parallel with the rod 45, a cam rod 86 is arranged which passes through the standards 45′ and is supported by the enlarged portion 86′ of the vertical rod 87. The suction cam 74 is pivotally connected to a collar 86² and adjustably mounted and fastened upon a rod 86 by a set screw 88. The enlarged portion 86′ of the rod 87 extends in an upward direction and is provided with an aperture to receive the rod 45 and is supported thereby. A slot 89 is provided in the horizontal angle bar 15, the slot providing for the lateral movement of the rod 87 and sleeve 87′ and a guide for its upper end.

The guide sleeve 87′ is fitted to the upper end of the rod 87 having one end extending into the slot 89. At a pre-determined distance below the horizontal bar 15 to the guiding sleeve 87′, a rod 91 is attached which extends inwardly passing through an eye in the bracket 90. The bracket 90 is attached to the bottom of the angle bar 15. A coil spring 92 surrounds the rod 91 and is interposed between the collar 93 and the bracket 90. The torsion of the spring 92 is exerted against the vertical rod 87, forcing it in an outward direction normally withdrawing the cam 74 from between the rollers 73 and 78′. On the same side of the machine that the vertical rod 87 is arranged, a horizontal cam 94 is attached to the side of the main cam 57. The function of this horizontal cam 94 is to force the vertical rod 87 and its connections inwardly and thus at the proper time, through the medium of the cam 74, lift the suction foot 68 and with it a sheet of paper off the pack of paper. At a point directly back of the suction foot 68, the loop regulator 69 is attached which consists of a socket 95 having an arm 95′, which is secured in the desired position on the rod 45 by a set screw 95².

The arm 95′ extends rearward and is provided with a slot 96 and a depending rod 97 is connected to the arm 95′ so as to be vertically adjustable in the slot 96 by the locking nuts 98. The loop regulator 69 is constructed with diverging fingers 99. A suction or air pump 100 is fastened to the frame 4 and is provided at its front with a hose bit 101 to which a hose 102 or the like is connected; said hose being extended forward and upward to the horizontal angle bar 15 and along its top to a point near the top of the suction foot tube 77 to which it is connected by a short piece of rubber hose 102′. In the pump cylinder at a pre-determined point, an air vent 103 is provided to permit air to enter the pump cylinder after the piston (piston not shown) has passed by the air vent destroying the suction at the suction foot 68 caused by the vacuum in the pump cylinder. The piston is connected to the piston rod 104 and at its free end a short horizontal connecting plate 105 is attached thereto which extends in an outward direction, and the free end of the plate 105 is attached to the actuating rod 106 which extends forward to the front end of the device, passing through the supporting bearings 107 which hold the rod 106 in position and permits of its free sliding movement in said bearings. The bearings 107 are attached to the vertical bars 13 of the framework 12.

At a pre-determined point on the pump actuating rod 106, a stud 108 is secured. Upon the inside of the vertical stop bar 1′, a stop plate 109 is secured which is provided with parallel slots 109′. Bolts 110 pass through said slots and washers are interposed between the head of the bolts and the face of the plate 109. The bolts are tightened just sufficient to permit the stop plate 109 to readily slide between the washers and the face of the stop bar 1′. The stop plate 109 is held at its highest point by the spring 111 or other yielding means. To the lower part of the stop plate a flexible connection 112 is attached which is connected to the top of the press (not shown) in such a manner that when the feeder of the press operates said trip the action of the trip of the press is communicated to the stop plate through the flexible connection 112 and the stop plate is drawn downward against the torsion of the spring 111 out of the range of the stud 108. In the upper part of the stop plate 109, a notch 113 is provided which is adapted to engage with the lip 113′ of the pawl 114. On the lower end of the pawl 114, a stud 118 is secured. When the trip plate 109 is drawn downward, the lip 113′ of the pawl 114 is forced to engage with the notch 113 by the action of the spring 115 which yieldingly holds the pawl in engagement with said notch. The pawl 114 assumes the position shown by the dotted lines when the lip 113′ is engaged with the notch 113.

It will be noted that the pawl 114 is pivotally secured to the vertical stop bar 1′ by a bolt 116 which permits it to swing freely. A flexible connection 117 is also connected to the stop plate 109 running to the front of the press where it terminates in the handle 117′ and is adapted to be used by the pressman when he desires to prevent the device from delivering a sheet of paper. On the corresponding side of the frame 4, a trip knuckle 119 is pivotally secured to the frame by a bolt 120. In the upper part of the trip knuckle a stud 121 is secured and extends outwardly in line with the pin 118 when the lip of the pawl is engaged in the notch 113 of the stop plate 109. The position of the trip knuckle 119 normally is such that the stud 121 is located above the plane of the stud 118 in which position it is held by the torsion of the spring 122 pressing the trip knuckle against the pin 123.

When the stop plate 109 is pulled down to its lower position, the lip 113' of the pawl 114 is engaged in the notch 113, the pin 121 on the trip knuckle 119 engages the stud 118 and forces the pawl 114 to swing upon its pivot out of engagement with the notch 113, permitting the spring 111 to impart an upward movement to the stop plate 109, forcing the stop plate to its normal position at which time the stud 118 will be in a plane below the pin 121 and no engagement of the stud and pin will take place, and the device will continue to operate in a normal manner. Attention is called to the fact that the device after being tripped out of operation by hand, is thrown back into operation automatically.

At a desired point on the vertical stop bar 1', a cable 124 is attached which extends backward and passes around the periphery of the sheave pulley 35 and thence back to the vertical stop bar 1'. A spring 125 is used to connect this cable to the vertical stop bar 1' to give the cable proper tension to impart rotary movement to the pulley 35, thereby transmitting movement to the reels.

Reference numeral 124' represents the delivery board for the printed sheets.

The operation of the device is as follows:—In the drawings, attention is called to Figs. 3 and 24, which show the parts that actuate the mechanism of the device in their forward positions ready to be actuated by contact with the stop bars 1. In Fig. 3 the actuating pump rod is not shown. It will be observed that the operating mechanism is being supported by the presser feet carried by the standards and the suction foot is so arranged as to be in contact with the upper sheet of the pack of paper at the same time. The primary and secondary shafts which carry the reels are in their upward position free from all contact with the supports or finger which are adapted to support them as will be described hereinafter. The supports and the finger being in their extreme outward positions. As the device travels forward on the track, the pump rod 106 first comes in contact with the stop bar 1 and as it continues to travel forward it pushes the pump rod which carries the piston rearwardly, creating a vacuum in the pump chamber and the suction is communicated to the suction foot drawing the first sheet of the pack of paper in close contact therewith and retaining it there for a certain period of time. As the pump rod is pushed rearward, creating a vacuum as described, at a certain pre-determined distance, the stop bar 1 contacts with the movable rod 64 which carries the cams 57 and 94, pushing said rod and cams rearward. The rod 64 and the pump actuating rod 106 are both pushed rearward at the same time for a short distance of their travel until the stud 19 secured to the reel mechanism is reached in the forward travel of the device and the three actuating parts described; to-wit: The rod 64, the stud 19 and the actuating pump rod 106 are then moved forward simultaneously. The part of the reel mechanism carrying the extension finger and supports is moved to a position directly underneath the primary and secondary reels with the extension finger resting on top of the pack of paper sheets and between the single sheet of paper carried by the suction foot and the pack of paper. While the forward action of the reel mechanism is taking place, at the same time the rod actuating the cams 57 and 94 is moved rearward. The cam 57 sliding over the roller 56 until it reaches the incline portion thereof which permits the shaft 45 to move under the compression of the springs 53 to its upward position when the vertical sliding member to which it is attached is released from the catch of the pawl 25. The cam actuating rod 64 also carries the horizontal cam 94 which contacts with the vertical rod 87 and imparting a lateral movement thereto and to the suction cam 74 in one direction against the tension of the spring 92, imparting vertical movement to the suction foot 68 which carries one sheet of paper with it at which time the paper is brought in contact with the under surface of the loop 69 and its fingers 99, forming a loop in the sheet of paper carried by the suction foot.

The loop in the paper provides space for the extension finger 28 to enter. The sliding bar 18 carries a cam 22 upon its upper surface. The reel mechanism is provided with a roller 33 which extends over and rides upon the cam 22 and at a certain pre-determined point where the roller 33 rides upon the cam 22, the reel mechanism is lowered leaving the sheet of paper interposed therebetween, and both the primary and secondary reels come in contact with the supports and extension finger which carries rollers and as a rotary movement is imparted through the driving pulley 35 to the reel mechanism, the sheet of paper is reeled off the mechanism and delivered on its rearward travel, at the proper time on the pack of printed sheets. The cam 22 is provided with an outwardly extending pin 23 which is adapted to engage a pin 24 secured to the pawl 25 and as movement is imparted to the sliding bar 18 through the stud 19 and stop bar 1, the pawl 25 is forced to release the sliding vertical member 50 and permit the rod 45 to be lifted or forced to its upward position by the coil springs 53 surrounding the bolts 52. The parts are then in a position shown in Figs. 4 and 23.

It will be understood as stated that the reels are in contact with the supports and extension finger at this time and the machine is about to travel rearward to deliver the sheet upon the pack of paper sheets.

Immediately upon starting its travel rearwardly, the reels start to reel off the single sheet of paper and the primary reel 39 takes hold first and then the secondary reels 41 take hold of the sheet and keep it parallel or alined with its proper course of travel, and when it reaches the position of the printed sheets, or the like, it drops the sheet upon the pile of sheets on the delivery board and continues its travel rearward.

Attention is called to the fact that the suction of the pump is released at the same time that the pawl 25 is released from the vertical sliding member through the medium of the air vent 103 in the cylinder which allows an inrush of air to the cylinder chamber, destroying the vacuum which creates the suction and releasing the sheet of paper from contact with the suction foot.

Any tendency of the sheet to fly upward at the side is regulated by the guides 67 which are arranged to hold the front of the sheet down so that it will pass under the secondary delivery reels without wrinkling.

As the device travels in a rearward direction, the action of the delivery reels forces or reels the sheet forward at a speed which equals the movement of the device, thereby delivering the sheet without dragging or mutilating it.

When the device is traveling rearward, the plate 109 which is secured on the inside of the vertical stop bar 1', engages the stud 108 which is secured to the pump actuating rod 106 and pushes it forward carrying the piston rod 104 and piston back to their original positions. The vertical stop bar 1' is next engaged by the enlarged part of the stud 63 which is connected to the rod 64 and pushes it forward forcing the cam 57 to impart a downward movement to the vertical sliding member 50 until the lip 58 of the pawl 25, engages the top of the vertical sliding member 50 and holds it in its downward position against the pressure of the springs 53, when the presser feet 46 and the loop regulator 69 are again in position on top of the pile of paper sheets. The weight of the operating mechanism is then carried by the presser feet 46 of the standards 45' and the shaft 27 carrying the supports and extension finger, is elevated a sufficient distance to permit the primary extension finger 28 to clear the pack of sheets in its forward movement. The sleeve 63³ next engages the vertical pin 20 which is secured to the sliding bar 18, raising the delivery reel mechanism by means of the cam 22 upon which the roller connected to the reel mechanism rides.

The horizontal cam 94 moves forward and permits the suction foot 68 to drop on the pack of paper sheets and at the same time the shaft 27 is moved forward, withdrawing the primary reel extension finger 28 from above the pile of paper sheets and the machine is then at the terminus of its rearward travel with all actuating parts in their proper position to contact with the vertical stop bar 1, when the machine is actuated to travel forward.

It will, of course, be understood that the operation as described above is repeated each time the machine travels to its forward and rearward terminus.

If for any reason it is desired to prevent the operation of the machine either at its rearward or forward travel, the pressman at one end grasps the handle 117' and exerts a downward pressure against the cable 117 which in turn pulls the stop plate 109 to its lower position and the lip 113' of the pawl 114 enters the notch 113 and holds the stop plate 109 below the pin 108 and when in this position no delivery of paper will take place as the suction operating mechanism is not operated, or the cable 112 arranged at the opposite end of the press is given a downward pull and the same result is obtained.

It will be noted that while the device is designed and operated as an interleaving machine and used in combination with a printing press, its construction is such that it can readily be combined with a frame (or other device) and one sliding and one fixed table, in such a manner that after the printed sheets which have been interleaved have laid a sufficient time to permit the ink to set, they can be placed on the device and automatically separated into the original piles. This operation is known to the trade as "removing slip sheets" and the device with this combination is equally efficient for this purpose, as the operation is exactly the same as when placed on the press for the purpose of interleaving. To effect this differing result; for example, a frame can be provided with the proper track to carry the machine, the actuating or driving arms, and below the device a sliding table can be provided to receive one sheet. This table moves backward and forward the proper distance to receive one sheet and also to permit the alternate sheet to drop to the fixed table which is installed below the sliding table when at its forward terminus. The sliding table will travel once while the device will travel twice, and will be actuated by a cam in such a manner that it will dwell at its forward terminus the length of time necessary to permit the sheet to be properly laid in position upon it.

While the particular mechanism and arrangement of the parts to carry the frame and transmit the motion from the press to the device, shown by the accompanying drawings, is especially adapted for use on one particular type of press, it is obvious that various modifications may be made in the construction to adapt the device to other forms of presses and machines without departing from the spirit of this invention. The vertical stop bars 1—1 and 1'—1' have their faces that contact with the actuating parts curved so that the proper adjustment of the parts can be made.

What we claim is:—

1. An interleaving device comprising a reciprocating carriage, a support for a pile of sheets, means to lift a single sheet up from a pile of sheets automatically and deposit said sheet upon a sheet derived from another source, and means mounted on the carriage for actuating said sheet engaging means.

2. An interleaving device comprising a reciprocating carriage, a support for a pile of sheets, a suction device mounted on said carriage, and means mounted on the carriage to actuate said suction device to lift a single sheet up from a pile of sheets automatically and deposit said sheet upon a sheet derived from another source.

3. An interleaving device comprising a carriage, operating means mounted on said carriage, a suction device mounted on said carriage, and means actuated by said operating means to lift a single sheet from a pack of leaves automatically and deposit said sheet directly upon a sheet derived from another source for interleaving purposes.

4. An interleaving device comprising a carriage, means to lift a single sheet from a pack of sheets automatically and deposit said sheet upon a sheet derived from another source; and means mounted on the carriage to actuate said sheet engaging means, said operation being continuous whereby a pack of interleaved sheets is made up of the sheets from both sources.

5. An interleaving device comprising a reciprocating carriage, a support for a pile of sheets, means to lift a single sheet from the pile of sheets automatically and deposit said sheet upon a sheet automatically derived from another source, and means mounted on the carriage to actuate said sheet engaging means, said operation being continuous whereby a pack of interleaved sheets is made up of the sheets from both sources.

6. An interleaving device comprising a carriage, a support for a pile of sheets, means to lift a single sheet from a pack of sheets automatically and deposit said sheet upon a sheet derived from another source; and means mounted on the carriage to actuate said sheet engaging means, said operation being continuous whereby a pack of interleaved sheets is made up of the sheets alternately derived from both sources.

7. An interleaving machine comprising tracks, a carriage to reciprocate upon said tracks, a feed board attached to the carriage for carrying a pack of paper sheets, means to lift a sheet of paper from the feed board, and means mounted on the carriage to actuate said sheet engaging means, and means also actuated by said actuating means to deposit said sheet on another sheet derived from a different source.

8. In an interleaving machine, tracks, a carriage to reciprocate on said tracks, a feed board for carrying a pack of paper sheets mounted on said carriage, means to lift a sheet of paper from said feed board, and means mounted on the carriage to actuate said sheet engaging means, and means also actuated by said actuating means to deposit said sheet on another sheet derived from a different source; said leaves being delivered on each other alternately.

9. In an interleaving machine, tracks, a carriage to reciprocate on said tracks, operating means mounted on said carriage, a feed board mounted on said carriage, carrying a pack of sheets, means actuated by the operating means to lift a sheet of paper from the pack of sheets and means also actuated by said operating means to deliver said sheet on another sheet derived from a different source; both of said sheets being delivered automatically and alternately with each other for interleaving purposes.

10. An interleaving device comprising a carriage, means to reciprocate said carriage, operating means mounted on said carriage, a feed board carrying a pack of paper sheets mounted on said carriage, means to support the operating means of the device upon said pack of sheets for part of its travel, and means actuated by said operating means for separating the sheets of the pack for interleaving purposes.

11. An interleaving device, comprising a carriage, means to reciprocate said carriage, a feed board carrying a pack of paper sheets mounted on said carriage, an operating means, means to support the operating means upon said pack of sheets during a part of the travel, an extension finger adapted to support the operating mechanism for part of its travel when resting on a pack of sheets, and means actuated by said operating means for separating the sheets of the pack for interleaving purposes.

12. An interleaving device comprising a carriage, means to reciprocate said carriage, a feed board carrying a pack of paper sheets mounted on said carriage, an operating means, means to support the operating means upon said pack of sheets during a part of the travel, an extension finger adapted to support the operating means when resting on the pack of sheets on the feed board, and means actuated by said operating means to withdraw a single sheet from the pack of sheets on the feed board.

13. An interleaving device comprising a carriage, means to reciprocate said carriage, a feed board carrying a pack of paper sheets mounted on said carriage, an operating means, means to support the operating means upon said pack of sheets during a part of the travel, an extension finger adapted to support the operating means when resting on a pack of sheets for part of its travel, and means actuated by said operating means to withdraw a single sheet of paper from the pack of sheets on the feed board, and means to reel off said single sheet of paper and deposit it upon a sheet of paper derived from a different source.

14. An interleaving device comprising a carriage, means to reciprocate said carriage, a feed board carrying a pack of paper sheets mounted on said carriage, an operating means, means to support the operating means upon said pack of sheets during a part of the travel, an extension finger adapted to support, for part of its travel, the operating means when resting on a pack of sheets, and means actuated by said operating means to withdraw a single sheet of paper from the pack of sheets on the feed board, and means to reel off a single sheet of paper and deposit it upon a sheet derived from a different source.

15. An interleaving device comprising a carriage, means to reciprocate said carriage, a feed board carrying a pack of paper sheets mounted on said carriage, an operating means, means to support the operating means upon said pack of sheets during a part of the travel, an extension finger adapted to support, for part of its travel, the operating means when resting on a pack of sheets, means actuated by said operating means to withdraw a single sheet of paper from the pack of sheets on the feed board, means to reel off a single sheet of paper and deposit it upon a sheet derived from a different source and means to throw the interleaving device out of operation.

16. An interleaving device comprising a carriage, means to reciprocate said carriage, a feed board carrying a pack of paper sheets mounted on said carriage, an operating means, means to support the operating means upon said pack of sheets during a part of the travel, an extension finger adapted to support the operating means when resting on a pack of sheets, means actuated by said operating means to lift a single sheet of paper from the pack of sheets on the feed board, means to reel off said single sheet of paper and deposit it upon a sheet derived from a different source, means to throw the interleaving device out of operation and automatic means of throwing the device into operation.

17. An interleaving device comprising a carriage, means to reciprocate said carriage, a feed board carrying a pack of paper sheets mounted on said carriage, an operating means, means to support the operating means upon said pack of sheets during a part of the travel, an extension finger adapted to support the operating means when resting on a pack of sheets, means actuated by said supporting means to lift a single sheet of paper from the pack of sheets on the feed board, means to reel off said single sheet of paper and deposit it upon a sheet derived from a different source, and means to throw the interleaving device out of operation on both ends of the press and automatic means of throwing the device into operation.

18. An interleaving device, a frame, a carriage upon which said frame is mounted, an operating means carried thereby, a feed board carrying a pack of single sheets mounted on the carriage, means actuated by said operating means to separate and lift a single sheet from the pack, reel supports, a finger extension to support a reel and adapted to be moved underneath said sheet, a reel mechanism carrying reels adapted to be moved to a position on top of said sheet contacting with and resting upon the supports and finger extension with the single sheet interposed between them and adapted to be reeled off the device and deposited at a predetermined time upon a sheet derived from a different source.

19. An interleaving device, a frame, a carriage upon which said frame is mounted, an operating means carried thereby, a feed board carrying a pack of single sheets mounted on the carriage, means actuated by said operating means to lift a single sheet from the pack, supports, a finger extension adapted to be moved underneath said sheet, a reel mechanism carrying reels adapted to be moved to a position on top of the supports and finger extension whereby said single sheet is reeled off the mechanism and deposited at a predetermined time upon a sheet derived from a different source.

20. An interleaving device, a frame, a carriage upon which said frame is mounted, an operating means carried thereby, a feed board carrying a pack of single sheets mounted on the carriage, means actuated by said operating means to lift a single sheet from the pack, supports, a finger extension adapted to be moved underneath said sheet, a reel mechanism carrying reels adapted to be moved to a position on top of the supports and finger extension whereby said single sheet is reeled off the mechanism and deposited at a predetermined time upon a sheet derived from a different source, and means to impart movement to the reel mechanism.

21. An interleaving device comprising tracks, a carriage adapted to be reciprocated on said tracks, an operating means carried thereby, a frame secured to said carriage, a feed board carrying a pile of sheets removably mounted on said frame, means actuated by said operating means to withdraw a single sheet of paper from the pile on the feed board, yokes attached to the frame, pivoted bars attached to said yokes on one end with the free ends rigidly attached to the operating mechanism to permit the operating mechanism to move in a vertical direction.

22. An interleaving device comprising tracks, a carriage adapted to be reciprocated on said tracks, an operating means carried thereby, a frame secured to said carriage, a feed board carrying a pile of sheets removably mounted on said frame, means actuated by said operating means to withdraw a single sheet from a pile of sheets on the feed board, yokes attached to the frame, pivoted bars attached to said yokes on one end with the free ends rigidly attached to the operating mechanism to permit the operating mechanism to move in a vertical direction, one leg of each of said yokes being adapted to ride upon said tracks.

23. An interleaving device comprising tracks, a carriage adapted to be reciprocated on said tracks, an operating means carried thereby, a frame secured to said carriage, a feed board carrying a pile of sheets removably mounted on said frame, means actuated by said operating means to lift a single sheet from the pile of sheets on the feed board, yokes attached to the frame, pivoted bars attached to said yokes on one end with the free ends rigidly attached to the operating means to permit the operating means to move in a vertical direction, one leg of each of said yokes being adapted to ride upon said tracks, and a roller carried by said yokes and arranged to keep the rear end of the carriage from tilting.

24. In an interleaving device, an operating means, means vertically operable to carry the operating means a certain period of time, a reciprocating carriage, means to carry a pack of single sheets of paper mounted on said carriage, means actuated by said operating means to create a suction and apply it to the upper sheet of the pack so as to lift one sheet from the pack of sheets, a reel mechanism, means to support said reel mechanism; said reel mechanism being adapted to reel off the device a single sheet of paper at the same speed that the carriage is being reciprocated.

25. In an interleaving device, an operating means, means vertically operable to yieldingly carry the operating means a certain period of time, a reciprocating carriage, means to carry a pack of single sheets of paper mounted on said carriage, means actuated by said operating means to create a suction and apply it to the upper sheet of the pack so as to lift one sheet from the pack of sheets, a reel mechanism, means to support said reel mechanism; said reel mechanism being adapted to reel off a single sheet of paper at the same speed that the carriage is being reciprocated.

26. In an interleaving device, an operating means, means vertically operable to carry the operating means a certain period of time, means to depress said vertical operable means, means to carry a pack of single sheets of paper, means actuated by said operating means to create a suction and apply it so as to withdraw one sheet from the pack of sheets, a reel mechanism, and means to support said reel mechanism.

27. In an interleaving device, an operating means, means vertically operable to carry the operating means a certain period of time, means to depress said vertical operable means, means to release the vertically operable means, means to carry a pack of single sheets of paper, means actuated by said operating means to create a suction and apply it so as to withdraw one sheet from the pack of sheets, a reel mechanism, and means to support said reel mechanism.

28. In an interleaving device, a carriage, means for reciprocating said carriage, an operating means mounted thereon, means vertically operable to carry the operating means a certain period of time, means to depress said vertical operable means, means to release the vertically operable means, means to carry a pack of single sheets of paper, means actuated by said operating means to create a suction and apply it so as to withdraw one sheet from the pack of sheets, a reel mechanism, means to support said reel mechanism; said reel mechanism being adapted to reel off the sheet from between the supporting means and the reel mechanism at the same speed that the device is reciprocating.

29. In an interleaving device, an operating means, means vertically operable to carry the operating means a certain period of time, means to depress said vertical operable means, means to lift it to its normal position, means actuated by said operating means to carry a pack of single sheets of paper, means to create a suction and apply it on one sheet of the pack of sheets, a reel mechanism, and means to support said reel mechanism.

30. In an interleaving device, an operating means, means vertically operable to carry the operating means a certain period of time, means to depress said vertical operable means, means to hold the operable means depressed, means to automatically release the operable means, means to lift it to its normal position, means to carry a pack of single sheets of paper, means actuated by said operating means to create a suction and apply it on one sheet of the pack of sheets, a reel mechanism, and means to support said reel mechanism.

31. An interleaving device, an operating means, means vertically operable to carry the operating means a certain period of time, means to depress said vertical operable means, means to hold the operable means depressed, means to automatically release the operable means, means to lift it to its normal position, means to carry a pack of single sheets of paper, means actuated by said operating means to create a suction and apply it on one sheet of the pack of sheets, a reel mechanism, means to raise and lower the reel mechanism, and means to support the reel mechanism.

32. An interleaving device comprising a reciprocating carriage, a frame mounted on said carriage, a feed board carried by the carriage having a pile of single sheets of paper mounted thereon, an operating means mounted on said carriage, yokes secured to said carriage, bars pivoted to said yokes, said operating means being connected to the free ends of said pivoted bars which permits vertical movement of said operating means, means actuated by said operating means to separate said sheets from the pile.

33. An interleaving device comprising a reciprocating carriage, a frame mounted on said carriage, a feed board carried by said carriage having a pile of paper sheets mounted thereon, yokes secured to said carriage, bars pivoted to said yokes on one end, an interleaving device operating means carried by the free ends of said pivoted bars which permits vertical pivotal movement of the operating means, and means to suspend said operating means, means actuated by said operating means to separate said leaves for interleaving purposes.

34. In an interleaving device, a carriage, means to impart reciprocating movement thereto, a feed board carrying a pack of sheets mounted thereon, an operating means mounted on said carriage, a pump, means to impart movement to the piston of said pump to create a vacuum, means actuated by said operating means to apply the suction created by said vacuum on the pack of paper sheets and lift a single sheet therefrom, means to destroy said suction, means to deliver said single sheet upon a single sheet or pack of sheets which are derived from a different source.

35. An interleaving device comprising a carriage, an operating means, a frame mounted on said carriage, a feed board removably carried by said frame adapted to carry a pack of single sheets of paper, means actuated by said operating means to withdraw a single sheet from the pack of sheets and hold it in contact with part of the operating means, means adapted to rest upon the pack of paper sheets and carry the operating means for part of its travel, a reeling mechanism adapted to reel off the single sheet from the device at a predetermined time and place.

36. An interleaving device comprising a carriage, an operating means, a frame mounted on said carriage, a feed board removably carried by said frame adapted to carry a pack of single sheets of paper, means actuated by said operating means to withdraw a single sheet from the pack of sheets and hold it in contact with part of the operating means, means adapted to rest upon the pack of paper sheets and carry the operating means for part of its travel, additional supporting means to rest upon the pack of sheets and carry the operating means the balance of its travel, and a reeling mechanism adapted to reel off the single sheet from the device at a predetermined time and place.

37. An interleaving device comprising a carriage, an operating means, a frame mounted on said carriage, a feed board removably carried by said frame adapted to carry a pack of single sheets of paper, means actuated by said operating means to lift a single sheet from the pack of sheets and hold it in contact with part of the operating means, means adapted to rest upon the pack of paper sheets and carry the operating means for part of its travel, and a reeling mechanism adapted to reel off the single sheet from the device at a predetermined time and place.

38. An interleaving device comprising a carriage, an operating means, a frame mounted on said carriage carrying a feed board, a framework mounted on each side of said frame, primary and secondary reels mounted on said framework, a rod mounted on said framework and arranged for vertical movement; said rod being depressed at one end of the travel of the carriage and released for upward movement at the opposite end of the travel of the carriage, a shaft carried by said reel mechanism, supports mounted on said shaft to support the secondary reel mechanism, an extension finger mounted on said shaft and adapted to support the primary reel mechanism; said extension finger support when moved to its forward position being adapted to rest upon a pack of sheets of paper on the feed board and support the mechanism for a period of its travel, a pump arranged on said frame, means to operate said pump to create a vacuum, means actuated by said operating means of communicating the suction of the pump to the top sheet of the pack, mechanism to impart vertical movement to the suction mechanism, whereby the sheet is carried at a certain period of the travel of the carriage in an upward direction, means to release the suction from the sheet, means to reel said sheet off the device and deposit it at a predetermined point, standards attached to the rod, means to permit the rod carrying the standards to be forced or lifted to its upward position free from contact with the pack of sheets, means to return all of the parts of the operating mechanism to their original positions at the terminus of the rearward and forward travel preparatory to delivering another sheet upon a sheet or pack of sheets derived from another source.

39. An interleaving device comprising a carriage, an operating means, a frame mounted on said carriage carrying a feed board, a framework mounted on each side of said frame, primary and secondary reels mounted on said framework, a rod mounted on said framework and arranged for vertical movement; said rod being depressed at one end of the travel of the carriage and released for upward movement at the opposite end of the travel of the carriage, a shaft carried by said reel mechanism, supports mounted on said shaft to support the secondary reel mechanism, an extension finger mounted on said shaft and adapted to support the primary reel mechanism; said extension finger support when moved to its forward position being adapted to rest upon a pack of sheets of paper on the feed board and support the mechanism for a period of its travel, means to support the operating means for the balance of its travel, a pump arranged on said frame, means to operate said pump to create a vacuum, means actuated by said operating means of communicating the suction of the pump to the top sheet of the pack, mechanism to impart vertical movement to the suction mechanism, whereby the sheet is carried at a certain period of the travel of the carriage in an upward direction, means to release the suction from the sheet, means to reel said sheet off the device and deposit it at a predetermined point, standards attached to the rod, means to permit the rod carrying the standards to be forced or lifted to its upward position free from contact with the pack of sheets, means to return all of the parts of the operating means to their original positions at the terminus of the rearward and forward travel preparatory to delivering another sheet upon a sheet or pack of sheets derived from another source.

40. An interleaving device comprising a reciprocating carriage, a frame mounted thereon, a feed board carrying a pack of sheets mounted on said carriage, means mounted on the frame to create a suction on the top sheet of the pack of sheets and draw a single sheet in close contact therewith, means to raise said suction creating means carrying said single sheet with it, means to automatically release said sheet from said suction and means to deliver and deposit said single sheet of paper at a predetermined point and place each time the carriage completes its rearward and forward travel.

41. In an interleaving device comprising a reciprocating carriage, an operating means carried thereon, a frame mounted thereon, a feed board carrying a pile of sheets removably mounted in the frame, yokes secured on the frame, tracks for said carriage, parallel horizontal bars secured to and arranged above said tracks, rollers on the yokes adapted to ride upon the tracks underneath said horizontal parallel bars to keep the rear end of said carriage from tilting, means actuated by said operating means to separate said sheets for interleaving purposes.

42. In an interleaving machine comprising a reciprocating carriage, an operating means mounted on the carriage, a frame, a feed board carrying a pack of single sheets of paper mounted on said carriage, means actuated by said operating means and carried by said carriage to lift a single sheet from the pack, means to release said sheet, means to reel off of the mechanism a single sheet of paper at a predetermined point and place, vertical stops arranged on both sides of said device to contact therewith and to impart movement to the actuating parts of the mechanism and return said parts to their proper positions when they have performed their functions.

43. In an interleaving machine comprising a reciprocating carriage, an operating means mounted on the carriage, a frame mounted thereon, a feed board carrying a pack of single sheets of paper mounted on said carriage, means actuated by said operating means and carried by said frame to lift a single sheet from the pack, means to permit said sheet to be released and means to reel off said single sheet of paper at a predetermined point, vertical stops arranged on both sides of said device to impart movement to the actuating parts of the mechanism and return them to their proper positions when they have performed their functions, part of said actuating parts being made eccentric where they contact with the 44. In an interleaving machine, a carriage, tracks for said carriage, means to reciprocate said carriage, a frame mounted on said carriage, a feed board carried by said frame having a pack comprising sheets of paper mounted on said feed board, means to automatically lift one of said sheets of paper from the pack of sheets and retain it for a certain period of time, means to release said single sheet, reeling mechanism to contact with said single sheet and reel it off at a predetermined time and location.

45. In an interleaving machine, a carriage, tracks for said carriage, operating means mounted on the carriage, means to reciprocate said carriage, a frame mounted on said carriage, a feed board mounted on said frame having a pile comprising sheets of paper mounted on said feed board, means actuated by said operating means to automatically lift one of said sheets of paper from the pack of sheets and retain it for a certain period of time, means to release said single sheet, reeling mechanism to contact with said single sheet and reel it off at a predetermined time and place, means for throwing the interleaving operating means out of operation, and means of automatically throwing said interleaving operating means into operation.

46. In an interleaving device comprising a carriage, tracks for said carriage, an operating means mounted on the carriage, means to reciprocate said carriage on said tracks, a frame mounted on said carriage, a feed board carried by said frame having a pack of paper sheets mounted thereon, means actuated by said operating means to lift a single sheet of paper from said pack of sheets and means to release said sheet of paper, reeling mechanism adapted to reel said single sheet from the device at a certain predetermined time and place, and vertical stops arranged on tracks and adapted to come in contact in its reciprocation with parts that actuate the operating means.

47. In an interleaving device, a carriage, a frame mounted on said carriage, a feed board mounted on the frame having a pack of paper sheets mounted thereon, means to lift a single sheet from the pack, reeling mechanism to reel off from the pack said single sheet, and means to raise and lower said reeling mechanism.

48. In an interleaving device, a carriage, a frame mounted on said carriage, a feed board mounted on said frame having a pack of paper sheets mounted thereon, means to lift a single sheet from the pack, reeling mechanism to reel off from the pack said single sheet, means to raise and lower said reeling mechanism, and means to impart a horizontal movement to said reeling mechanism.

49. In an interleaving machine comprising a reciprocating carriage, an operating means mounted on the carriage, a frame, a feed board mounted on the frame having a pack of single sheets of paper mounted thereon, means actuated by said operating means and carried by said carriage to lift a single sheet from the pack, means to release said sheet, means to reel off a single sheet of paper at a predetermined point and place from the device, vertical stops having their faces curved and arranged on both sides of said device to contact therewith and to impart movement to the actuating parts of the mechanism and return said parts to their proper positions when they have performed their functions.

50. An interleaving device comprising a reciprocating carriage carrying a pile of sheets, operating means mounted on said carriage, means actuated by said operating means and carried by the carriage to separate sheets from the pile and deposit them directly upon sheets derived from another source.

51. In an interleaving device, a reciprocating carriage carrying a pile of sheets, operating means mounted on said carriage, means actuated by said operating means and carried by the carriage to apply a suction on said pile of sheets to lift each sheet off the pile separately, means to reel off and deposit each sheet at a predetermined point.

52. In an interleaving device, a reciprocating carriage carrying a pile of sheets, operating means mounted on said carriage, means actuated by said operating means and carried by the carriage to apply a suction on said pile of sheets to lift each sheet off the pile separately, means to reel off and deposit each sheet at a predetermined point and time.

53. In an interleaving device comprising a reciprocating carriage carrying a pack of sheets of paper, operating means mounted on said carriage, means to actuate said operating means, means actuated by said operating means carried by the carriage to separate each sheet from the pack and deposit it at a predetermined time and place.

54. In an interleaving device, a reciprocating carriage carrying a pile of sheets of paper, operating means mounted on said carriage, means actuated by said operating means carried by the carriage to apply a suction on said pile of sheets whereby each sheet is lifted separately and released at a predetermined place.

55. In an interleaving device, a reciprocating carriage carrying a pile of sheets of paper, operating means mounted on said carriage, means actuated by said operating means carried by the carriage to apply a suction on said pile of sheets whereby each sheet is lifted separately and released at a predetermined place and means to deliver said separate sheet directly on a sheet derived from another source.

56. In an interleaving device, a carriage, a support for a pile of sheets, means on the carriage to lift a single sheet up from the pile of sheets, means also carried by the carriage to receive the single sheet from the lifting means and to move the sheet onto a printed sheet, means carried by the carriage to operate the lifting means, and means to operate the said sheet receiving means.

57. In an interleaving device, a carriage, a support for a pile of sheets, means carried by the carriage for lifting a single sheet up from the pile of sheets, means also carried by the carriage for receiving the sheet from the lifting means and for moving same away from the latter, and means for operating each of the lifting and receiving means.

In testimony whereof we affix our signatures in presence of two witnesses.

JOSEPH F. JIROUSEK.
NIMROD T. PLUMMER.

Witnesses:
JOHN H. BOSS,
DOROTHY WENDLAND.